(12) United States Patent
Smith et al.

(10) Patent No.: US 11,267,531 B2
(45) Date of Patent: Mar. 8, 2022

(54) GEAR SHIFTING SYSTEM

(71) Applicant: CeramicSpeed Sport A/S, Holstebro (DK)

(72) Inventors: Jason Smith, Boulder, CO (US); Noah Granigan, Cape May Court House, NJ (US); Colin Diamond, Palmer Lake, CO (US); William Golding, Denver, CO (US); Garrett Gerchar, Boulder, CO (US); Morten Opprud Jakobsen, Holstebro (DK); Alexander Jacobson Rosenberry, Broomfield, CO (US)

(73) Assignee: CeramicSpeed Sport A/S, Holstebro (DK)

( * ) Notice: Subject to any disclaimer, the term of this patent is extended or adjusted under 35 U.S.C. 154(b) by 106 days.

(21) Appl. No.: 16/843,634

(22) Filed: Apr. 8, 2020

(65) Prior Publication Data

US 2020/0331559 A1 Oct. 22, 2020

Related U.S. Application Data

(60) Provisional application No. 62/836,864, filed on Apr. 22, 2019.

(51) Int. Cl.
*B62M 11/06* (2006.01)
*B62M 1/36* (2013.01)
*B62M 17/00* (2006.01)

(52) U.S. Cl.
CPC .............. *B62M 11/08* (2013.01); *B62M 1/36* (2013.01); *B62M 17/00* (2013.01)

(58) Field of Classification Search
CPC ........ B62M 11/08; B62M 1/36; B62M 11/06; B62M 17/00
See application file for complete search history.

(56) References Cited

U.S. PATENT DOCUMENTS

| | | | | |
|---|---|---|---|---|
| 649,878 A | * | 5/1900 | Scharbach | B62M 17/00 280/260 |
| 4,447,068 A | * | 5/1984 | Brooks | B62M 17/00 280/238 |
| 5,228,354 A | * | 7/1993 | Oosterwal | B62M 17/00 280/238 |
| 5,251,504 A | * | 10/1993 | Summerville, Jr | B62M 17/00 280/238 |
| 5,342,075 A | * | 8/1994 | Williams | B62M 13/02 280/236 |
| 5,622,081 A | * | 4/1997 | Clements | B62M 11/04 280/238 |

(Continued)

*Primary Examiner* — Tony H Winner
*Assistant Examiner* — Michael R Stabley
(74) *Attorney, Agent, or Firm* — Kilpatrick Townsend & Stockton, LLP

(57) ABSTRACT

A gear shifting system includes a drive shaft, a face gear, and at least one power transmission component(s). The gear system also includes a pinion gear assembly, which is coupled to the first end of the drive shaft. The pinion gear assembly is configured to mesh with one of the concentric gear-rings on the face gear, so that the rotational movement of the gear-ring is transmitted to the shaft. The gear shifting system is easy to operate, mechanically simple, can smoothly shift between gears under any gear shifting conditions, and exhibits decreased component wear.

14 Claims, 12 Drawing Sheets

(56) References Cited

U.S. PATENT DOCUMENTS

| | | | |
|---|---|---|---|
| 6,755,431 B2* | 6/2004 | Chang | B62M 11/04 |
| | | | 280/259 |
| 6,786,497 B1* | 9/2004 | Olszewski | B62M 11/12 |
| | | | 280/260 |
| 7,434,489 B1* | 10/2008 | Scranton | B62M 17/00 |
| | | | 280/236 |
| 8,015,892 B2* | 9/2011 | Liao | F16H 3/087 |
| | | | 74/337.5 |
| 10,894,577 B2* | 1/2021 | Smith | B62M 11/08 |
| 2009/0048051 A1* | 2/2009 | Koleoglou | F03D 9/25 |
| | | | 475/183 |
| 2019/0300116 A1* | 10/2019 | Smith | F16H 3/366 |

* cited by examiner

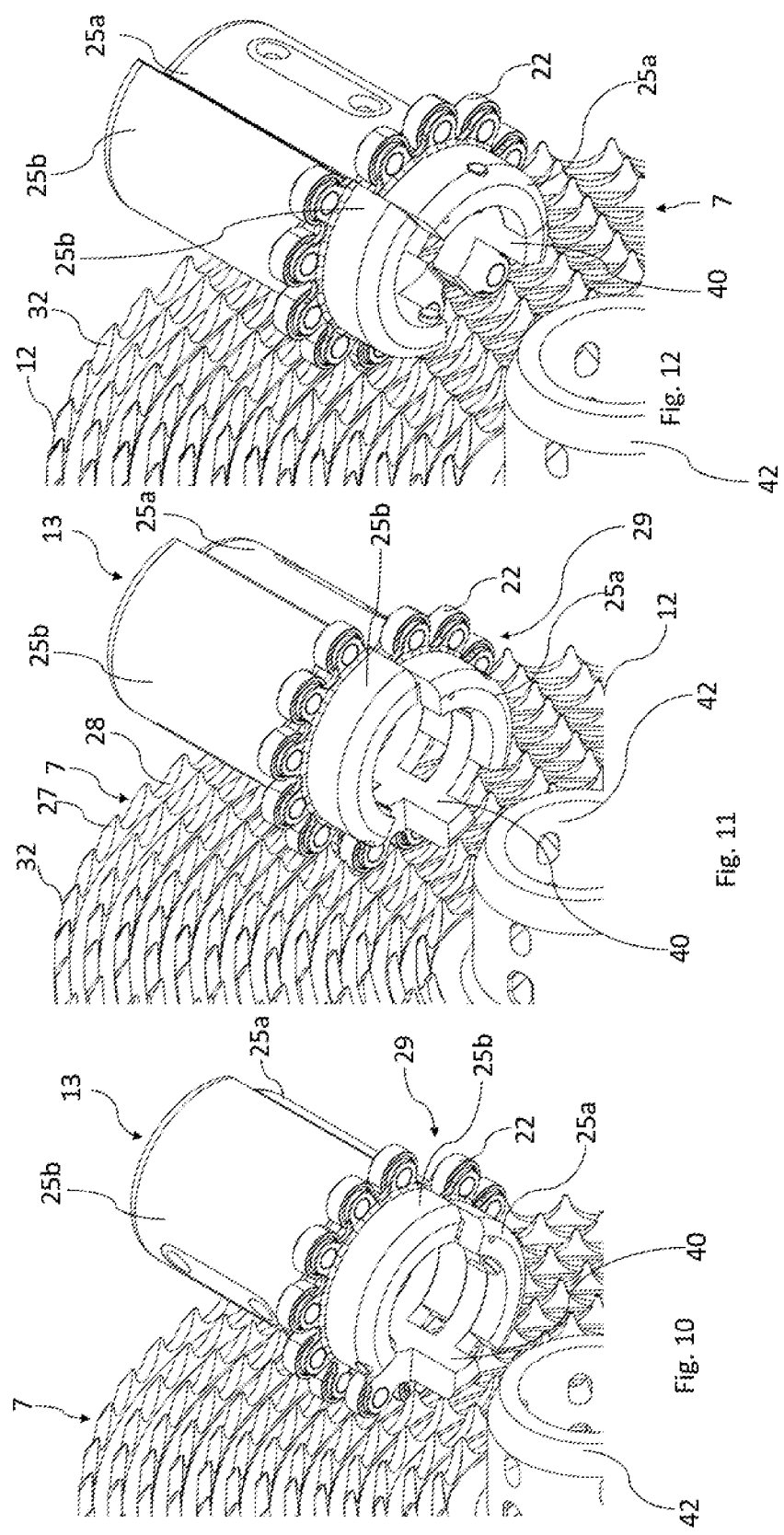

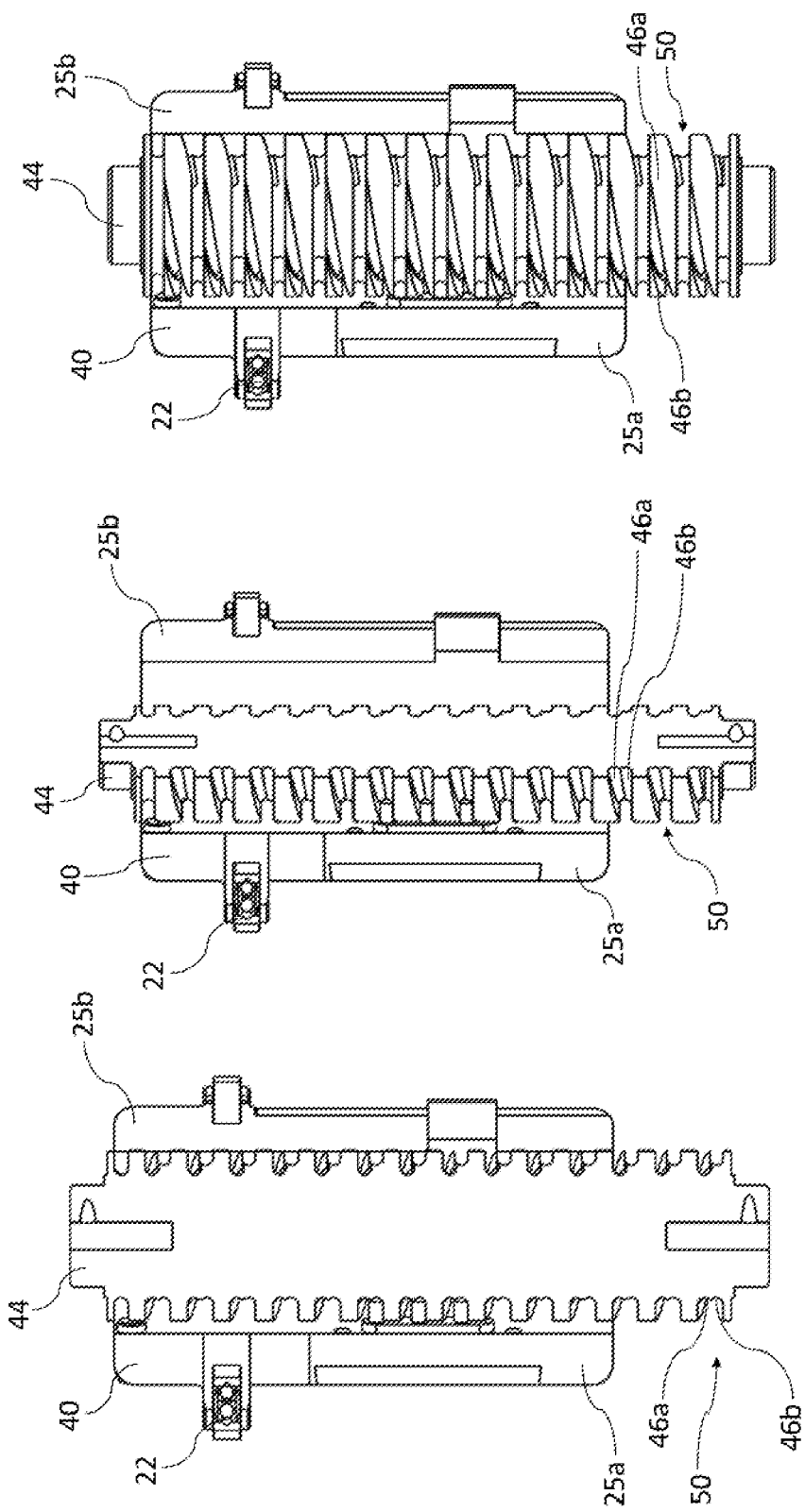

GEAR SHIFTING SYSTEM

REFERENCE TO RELATED APPLICATIONS

This application claims priority to U.S. Provisional Patent Application No. 62/836,864, filed on Apr. 22, 2019 and entitled A GEAR SHIFTING SYSTEM, and Danish Application No. PA 2019 01029, filed on Sep. 2, 2019 and entitled A GEAR SHIFTING SYSTEM, both of which are hereby incorporated by reference in their entireties.

FIELD OF THE INVENTION

The present invention relates to a gear shifting system. In particular, the present invention relates to a pinion gear shifting system.

BACKGROUND

Conventional gear systems utilize a face gear with multiple sprockets. These sprockets comprise a number of teeth and tooth valleys. A different set of gears engage the teeth and tooth valleys of the crown gear thereby transferring power from the motor to the wheels of the land vehicle.

Many different gear shifting systems have been described previously, for example both a chain drive and a shaft drive system. In the shaft drive system, teeth of a face gear engage teeth on a shaft.

Several bicycle shaft drive systems are presently available. Present bicycle shaft drive systems use either fixed-teeth gears meshing with fixed-teeth gears, or a roller-bushing system engaging with fixed teeth on a crown gear to provide for rotational power transfer.

For example, U.S. Pat. No. 5,078,416 discloses a bicycle shaft drive, which uses bevel-shaped fixed-tooth gears to receive and transmit rotational power. US 2011/0062678 (A1) discloses a bicycle shaft drive which uses flat-shaped fixed-tooth gears to receive and transmit rotational power. U.S. Pat. No. 7,434,489 discloses a bicycle shaft drive which uses ball-shaped fixed-teeth gears and cylinder-shaped fixed-teeth gears to receive and transmit rotational power. The document also describes a non-efficient method using rotating dowel pins mounted between the gear-rings of the face gear for the system to shift gears. Both WO 2006/049366 (A1) and WO 2007/132999 (A1) describe bicycle drive shafts which comprise bushings which engages in a crown gear. These roller-bushing systems provide for rotation of the rollers by using a simple sliding interface on a support member. U.S. Pat. No. 6,158,296 describes a split pinion gear, which comprises fixed non-rotating elements which engages in a crown gear. This system relies on the use of shift-channels to accommodate gear shifting of the gear transmission. Without the use of these shift-channels, the described gear transmission cannot shift gears. Using shift-channels to shift gears makes the gear transmission inefficient and slow to react None of these references describe a well-functioning and efficient gear shifting system. US 2011/0062678 (A1) requires the use of multiple gear-pinions to allow a shift between concentric gear-rings. Specifically, a pinion is required for each unique gear-ring. In the case of this document, four unique gear changes are available, and four (4) geared pinions are needed to transfer power at any one time to the respective four (4) concentric gear-rings. Additionally, during a gear change, the splined shaft must transition between pinions rotating at different speeds. This could cause an unsynchronized and grinding 'forced' mesh.

U.S. Pat. No. 7,434,489 uses a single gear-pinion. However, in order to enable a gear change, this single gear-pinion must be moved with force across adjacent gear-rings. If the rider is pedaling and therefore applying torque through the pinion during a gear shift, additional shifting force will be required to overcome the friction between the pinion teeth and the gear-ring teeth as the pinion teeth attempt to slide across the gear-ring teeth, while still applying rider torque during the lateral slide. This friction can create excessive wear of the teeth.

In view of existing gear shift systems, it would be advantageous to have a well-functioning gear shift system, which shift gears smoothly even during heavy rider pedaling torque, with no grinding, with no tooth-to-tooth lateral sliding friction, and is mechanically simple. Additionally, it would be advantageous to have a gear shift system which creates minimal component wear and has extended part longevity.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a gear shifting system includes a drive shaft, the drive shaft being configured for connecting a face gear and at least one power transmission component of the gear system. The gear system includes at least one power transmission component which is coupled to the second end of the drive shaft. The gear system also includes a face gear that includes a cog-disk and at least one concentric gear-ring, and a drive shaft having an axis of rotation and having a first end of the drive shaft and a second end. The drive shaft includes a pinion gear assembly coupled to the first end of the drive shaft in which the pinion gear assembly is configured to mesh with one of the concentric gear-rings on the face gear, so that the rotational movement of the gear-ring is transmitted to the shaft. In some examples, the pinion gear assembly includes one or more engaging elements, and the one or more engaging elements of the pinion gear assembly is engaging one of the concentric gear-rings of face gear. In various examples, the pinion gear assembly includes at least two split sections of a spinner.

In various embodiments, the pinion gear assembly includes any number of sections from two to as many as the number of engaging elements in the spinner. In some examples, the pinion gear assembly includes two to twelve sections. In certain aspects, the pinion gear assembly includes at least two sections which move independently of each other. In certain embodiments, the pinion gear assembly includes at least two sections wherein all the sections have the same number of engaging elements.

In some embodiments, the power transmission component is a front face gear, which is connected to pedals on a bicycle and/or a motor. In various aspects, the power transmission component is a front face gear, which is connected to pedals on a bicycle. In certain examples, the engaging elements are fixed engaging elements and/or rolling elements. In some examples, the engaging elements are fixed teeth, 3D-non rolling objects, bushings, bearings, ball bearings, roller bearings and/or double row ball bearings.

In certain examples, the face gear includes a number of gear-rings and wherein the teeth in at least some of the rings are placed so as to form a shift channel of teeth valleys extending in a radial direction of the cog-disk. In various embodiments, the teeth are placed to form at least three shift channels extending in different radial directions. In certain aspects, the shift channel are unconnected and/or solid.

In various embodiments, the cog-disk includes at least six concentric gear-rings, and wherein the gear-rings maintains a three-tooth increase per gear-ring. In some embodiments, the cog-disk includes at least six concentric gear-rings, the gear-rings maintains a three-tooth increase per gear-ring, and the number of teeth on the gear-rings are listed in this table: 15-18-21-24-27-30-33-36-39-42-45-48-51-54.

In certain embodiments, the pinion gear assembly includes a spinner, and the spinner has engaging elements uniformly distributed at a radial distance from the center. In various embodiments, one or more gear-rings of the face gear includes a plurality of teeth and tooth valleys, and the teeth extend at an angle to a surface plane of the cog-disk in the range of about 0° to about 120°. In some examples, an electromechanical gear-selection device is positioned inside of the drive shaft and connected to the gear shifting controller and the pinion gear assembly.

According to various embodiments, a method of shifting gears with a gear shifting system includes: before gear shifting is initiated, all of the sections are engaging the same gear-ring on the face gear; when gear shifting is initiated, at least one section is still engaging the initial gear-ring, whereas at least one other section moves axially, and in which this other section moves as to enter into the path of alignment with the new gear-ring; and as the shaft and pinion gear assembly continues to rotate, the other section, which is now aligned to the new gear-ring, will engage in the new gear-ring on the face gear s the shaft and pinion gear assembly continue to rotate. The method includes: as the initial section(s) disengage with the initial gear-ring, the initial section will move axially, in the similar direction of the other sections which have already moved axially; within one shaft rotation, all of the initial section(s) will have disengaged the initial gear-ring of the face gear, and subsequently moved axially to follow the other section(s) to become aligned, and engaged with, the new gear-ring); at this point all of the engaging elements composing the sections have moved, and have aligned with, the new gear-ring, and are again located within the same rotational plane; and at this point, the gear shifting is finalized and complete, and normal operation returns to the gear system.

According to some embodiments, a bicycle gear shifting system includes a drive shaft, the drive shaft being configured for connecting a front face and rear face gear of the bicycle drive system. The bicycle drive system includes a front face gear including a cog-disk and at least one concentric gear-ring, and a rear face gear including a cog-disk and at least one concentric gear-ring. The bicycle drive system also includes a drive shaft having an axis of rotation and having a first end of the drive shaft and a second end. The drive shaft includes a pinion gear assembly coupled to the first end of the drive shaft and/or a pinion gear assembly is coupled to the second end of the drive shaft in which the pinion gear assembly is configured to mesh with one of the concentric gear-rings on the front face gear or the rear face gear, so that the rotational movement of the gear-ring is transmitted to the shaft. The pinion gear assembly includes one or more engaging elements, and the one or more engaging elements of the pinion gear assembly is engaging one of the concentric gear-rings of rear face gear and/or of the front face gear. In certain examples, the pinion gear assembly engaging the rear face gear and/or of the front face gear includes at least two split sections of a spinner.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 2a is a perspective view of an embodiment of a pinion gear assembly connected to the drive shaft of the gear shifting system.

FIG. 2b is an exploded view of the pinion gear assembly connected to the drive shaft of the gear shifting system of FIG. 2a.

FIG. 2c is an exploded view of the pinion gear assembly connected to the drive shaft of the gear shifting system of FIG. 2a.

FIGS. 9 to 15 illustrates a perspective view drawing of a pinion gear assembly engaging with a face gear.

FIGS. 16a-16c illustrate sectional views of a shifting drum in connection with two sections and a rotator.

BRIEF DESCRIPTION

Figure 1:
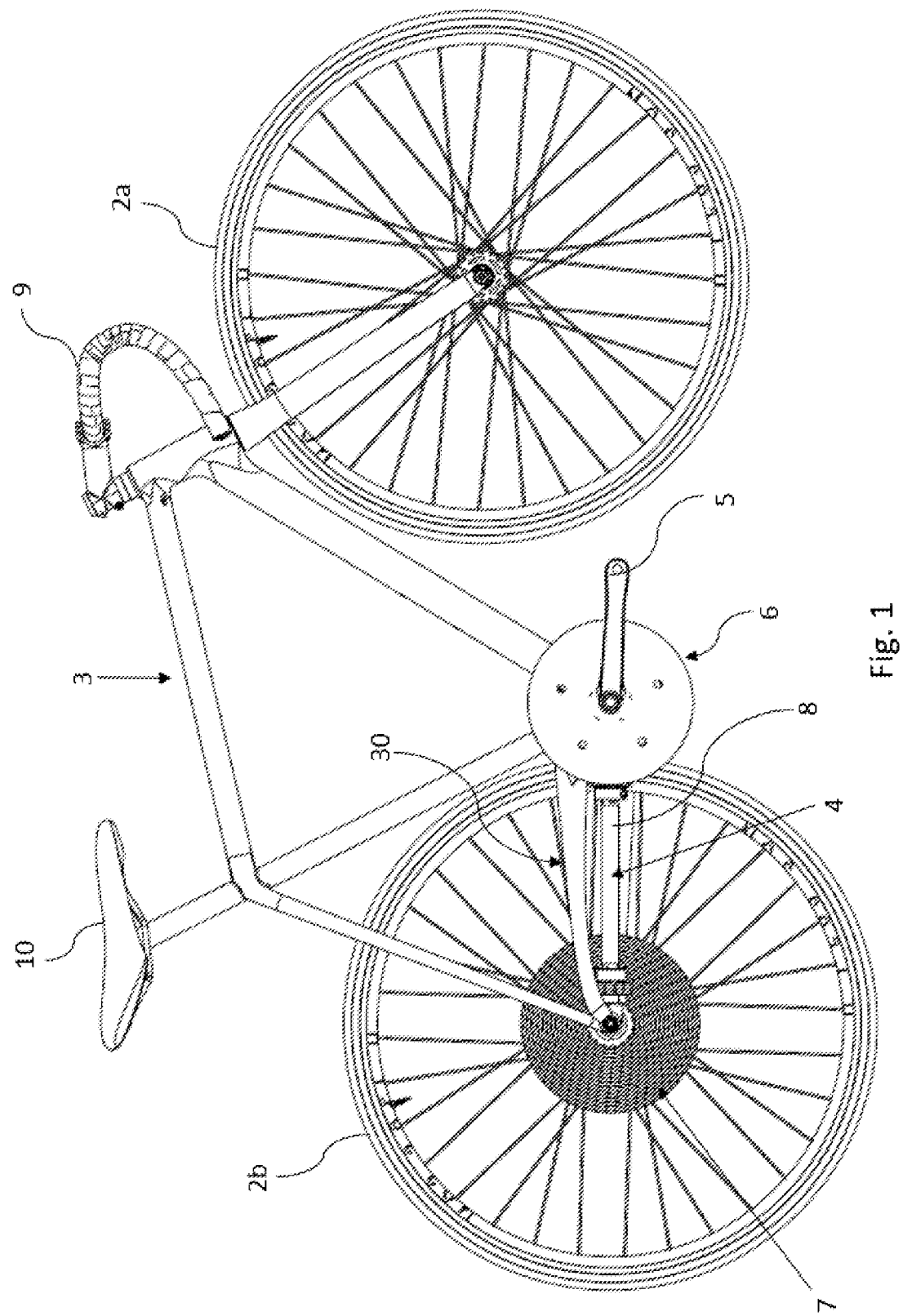
FIG. 1 is a side elevation of a bicycle with the gear shifting system according to a specific embodiment of the invention.

It is therefore an object of this invention to provide a new and improved gear shifting system, which is easy to operate, mechanically simple, can smoothly shift between gears under any pedaling conditions, and exhibits decreased component wear.

It is also an object of the invention to provide a gear shifting system, which can be used for any machine, which uses a gearing system. However, it is especially an object of the invention to provide a gear shifting system, which can be used for all land vehicles such as motorcycles, bikes, cars, and/or trucks In a specific embodiment of the invention, the pinion gear shifting system is used to shift gears on a bicycle shaft drive system. Bicycle drivetrains utilizing a shaft drive, instead of a chain to transmit rider power to the rear wheel, offer several advantages when compared to conventional chain drive systems.

The invention relates to a gear shifting system comprising a drive shaft, the drive shaft being configured for connecting a face gear and at least one power transmission component(s) of the gear system, the gear system comprising: at least one power transmission component(s) which is coupled to the second end of the drive shaft; and a face gear comprising a cog-disk and at least one concentric gear-ring(s); and a drive shaft having an axis of rotation and having a first end of the drive shaft and a second end; and wherein the drive shaft further comprises; a pinion gear assembly coupled to the first end of the drive shaft in which the pinion gear assembly is configured to mesh with one of the concentric gear-rings on the face gear, so that the rotational movement of the gear-ring is transmitted to the shaft; in which the pinion gear assembly comprises one or more engaging elements; and the one or more engaging elements of the pinion gear assembly are engaging one of the concentric gear-rings of face gear; characterized by the pinion gear assembly comprises at least two split sections of a spinner, wherein the spinner comprises at least 2 sections and a rotator.

This invention illustrates a highly advantageous gear shifting system, which can be used by the operator without losing speed, power or momentum. If the invention is utilized on a bicycle drive shaft system, then the rider can shift gears efficiently. The rider does not need to wait or time the gear shift but can shift gears even when pedaling, and no additional pedalling energy is required by the rider to enact a gear change.

The efficient gear shifting properties of this system are due to the construction of the pinion gear assembly. During gear shifting, the pinion gear assembly can split in half, so that each split section of the pinion gear assembly is aligned with two different gear-rings at one given time. A single, yet split, pinion gear assembly aligned with two gear-rings simultaneously results in a smooth and highly efficient gear shift without the loss of momentum, power and energy, and without extensive friction and wear.

However, in an alternative embodiment, the different pinion gear assembly split sections are not engaged with different gear-rings at the same time. In this embodiment, there is a point where a section disengages completely just before another section engages with a new gear-ring. However, the split sections can be aligned with two gear-rings at any given time.

In a specific embodiment of the invention, the invention is being used as a bicycle gear shifting system comprising a drive shaft, the drive shaft being configured for connecting a front face and rear face gear of the bicycle drive system, the bicycle drive system comprising: a front face gear comprising a cog-disk and at least one concentric gear-ring(s); and a rear face gear comprising a cog-disk and at least one concentric gear-ring(s); and a drive shaft having an axis of rotation and having a first end of the drive shaft and a second end; and wherein the drive shaft further comprises a pinion gear assembly coupled to the first end of the drive shaft and/or a pinion gear assembly is coupled to the second end of the drive shaft in which the pinion gear assembly is configured to mesh with one of the concentric gear-rings on the front face gear or the rear face gear, so that the rotational movement of the gear-ring is transmitted to the shaft; in which the pinion gear assembly comprises one or more engaging elements; and the one or more engaging elements of the pinion gear assembly is engaging one of the concentric gear-rings of rear face gear and/or of the front face gear; characterized by the pinion gear assembly engaging the rear face gear and/or of the front face gear comprises at least two split sections of a pinion gear assembly.

The invention is highly advantageous to use in a bicycle drive shaft system, since it is easy and simple to manufacture and use for the rider. So, the rider can shift gears without loss of power, energy and momentum.

In many bicycles today, it is possible to change gears both at the front next to the pedals and at the rear wheel. In one embodiment, it is possible to have the gear shifting system installed at both places or at just one of the places.

Preferably, the gear shifting system is installed, so that it is connected to the rear face gear of the bicycle. A bicycle gear shifting system, wherein the pinion gear assembly is coupled to the first end of the drive shaft in which the pinion gear assembly is configured to mesh with one of the concentric gear-rings on the face gear, so that the rotational movement of the gear-ring is transmitted to the shaft; in which the pinion gear assembly comprises one or more engaging elements; and the one or more engaging elements of the pinion gear assembly is engaging one of the concentric gear-rings of face gear; characterized by the pinion gear assembly comprises at least two split sections of a spinner.

The definitions written below are independent on the application of the gear shifting system whether it is connected to a bicycle, motor, or any other device.

The pinion gear assembly is connected to the first end of the drive shaft. The pinion gear assembly can be connected to the drive shaft by any means necessary. The second end of the drive shaft is connected to at least one power transmission component(s). The power transmission component(s) may be a motor, engine, another gear shifting system, or continuation of the transmission system. The other gear shifting system may be a conventional gear shifting system, or it may be a gear shifting system as described herein. Preferably, the power transmission component is a front face gear, which is connected to pedals on a bicycle and/or a motor. Most preferably, the power transmission component is a front face gear, which is connected to pedals on a bicycle.

The pinion gear assembly comprises a spinner. The spinner comprises a plurality of engaging elements. The engaging elements ensure smooth torque and power transfer, to or from, the face gear.

The pinion gear assembly's spinner comprises at least two sections. The two or more sections, composing the spinner, are able to split apart from each other during the gear shifting process. In one embodiment of the invention, the spinner and the at least two sections are mounted on the drive shaft. The two sections are mounted together using a joint that allows them to move axially, and in which there is a separate mechanical mechanism that delivers rotational torque from the shaft to the at least two sections. The mechanical mechanism may be splines or keyways. In a preferred embodiment, the at least two sections can be mounted together using a dovetail joint or similar, and then using a keyway to deliver rotational torque from the shaft to each section individually.

Advantageously, each spinner has engaging elements uniformly distributed at a radial distance from the center and uniform arc length relative to each engaging element. By uniformly distributed means that the distance between each engaging element is the same for all the engaging elements. The radial distance means the distance between the axis of rotation of the spinner to the outer edge of the engaging elements. The radial distance is constant for all the engaging elements in each spinner. The radial distance is dependent on the spinner size and the engaging element sizes. All engaging elements are placed in the spinner at a radial distance, so they can mesh and engage with the teeth and tooth valleys of the gear-rings on the face gear.

Therefore, in one embodiment of the invention, the pinion gear assembly comprises a spinner, and the spinner has engaging elements uniformly distributed at a radial distance from the center.

In a preferred embodiment of the invention, the pinion gear assembly's spinner comprises two to twenty-five engaging elements; more preferably from about six to about eighteen engaging elements; and most preferably from about ten to about fourteen engaging elements.

The spinner comprises a plurality of engaging elements and at least one spinner plate. Preferably, the spinner comprises two to the number of sections plus two spinner plates. For example, if the spinner comprises two sections, then the spinner may comprise four spinner plates. The spinner plate(s) ensures that the engaging elements are securely attached to the spinner.

In an alternative embodiment, the spinner plate and the engaging elements are manufactured from the same metal plate and are therefore in one piece.

The spinner plates may be equal, unequal or a combination, in size and shape. By combination is meant that a spinner comprising a multiple of sections may comprise some sections which are equal in size and some sections which are unequal in size. In a preferred embodiment the spinner plates are equal in size and shape.

The pinion gear assembly's spinner comprises at least two sections. The number of sections may be any number of sections from two to as many as the number of engaging elements in the spinner. The sections are located within the spinner. In a preferred embodiment, the pinion gear assembly comprises two to twelve sections.

The sections may be equal, unequal or a combination, in size and shape. The sections may be symmetrical or asymmetrical with respect to multiple sections. By combination it is meant that a spinner comprising multiple sections may comprise some sections which are equal in size and some sections which are unequal in size. In a preferred embodiment the sections are equal in size and shape. In a more preferred embodiment, the sections are equal in shape, but unequal in size.

The pinion gear assembly comprises at least two sections which may move independently of each other. Alternatively, the at least two sections move in a master/slave configuration. The movements of the sections are important during the gear shifting process. During normal operation, and before gear shifting is initiated, all of the sections are engaging the same gear-ring on the face gear. That is, all of the sections, and all of the engaging elements composing the sections, are positioned within the same rotational plane. When gear shifting is initiated, at least one section is still engaging (and transferring power to or from) the initial gear-ring, whereas at least one other non-engaging section moves axially (relative to the drive shaft axis). This other section moves to position itself, as to prepare to enter into the path of alignment of the new gear-ring. As the shaft and split pinion gear assembly continue to rotate, the other section, which is now positioned and aligned to the new gear-ring, will engage in the new gear-ring on the face gear as the shaft and split pinion gear assembly continue to rotate. As the shaft and split pinion gear assembly continue to rotate and as the initial section(s) disengage from the initial gear-ring, the initial section will move axially, in the similar direction of the other sections which have already moved axially. Within one shaft rotation, all of the initial section(s) will have disengaged the initial gear-ring of the face gear, and subsequently moved axially to follow the other section(s) to become re-positioned, aligned, and engaged with, the new gear-ring. At this point all of the engaging elements composing the sections have moved, and have aligned with, the new gear-ring, and are again positioned within a single rotational plane; albeit a different plane than prior to the gear shifting process. At this point, the gear shifting is finalized and complete, and normal operation returns to the gear system.

In a preferred embodiment, the pinion gear assembly comprises two to twelve sections which may move independently of each other. Or alternatively, the sections move in a master/slave configuration. This ensures a gear shifting system which can shift between all gears in the face gear efficiently.

In a preferred embodiment, the pinion gear assembly comprises sections with the same number of engaging elements.

In a more preferred embodiment, the pinion gear assembly comprises three sections, which may move independently of each other, or alternatively move in a master/slave configuration. This ensures a gear shifting system which can shift between all gears in the face gear efficiently. In a preferred embodiment, the three sections do not comprise the same number of engaging elements.

In an even more preferred embodiment, the pinion gear assembly comprises at least three sections, which moves independently of each other, or alternatively move in a master/slave configuration. The at least three sections may preferably have different numbers of engaging elements. One of the sections are also called a rotator. The rotator moves both axially on the drive shaft axis; and rotate around the drive shaft from about 0° up to about 36° of rotation. The movement of the rotator is in contrast to the movements of the two sections, wherein the sections only move axially on the drive shaft axis.

In a preferred embodiment, the rotator and at least one of the sections moves together axially along the center axis of the drive shaft.

In one embodiment, when gear shifting is commanded, the rotator and the at least one section always move first axially along the drive shaft. The gear shifting cycles is complete, when another section follows the axial movement of the first section and rotator.

In a most preferred embodiment, the pinion gear assembly comprises three sections, which moves independently of each other. One of the sections comprises six engaging elements, and one section comprises four engaging elements, and the last section comprises two engaging elements. The section comprising two engaging elements are also called a rotator. In a preferred embodiment, the rotator and the section comprising the four engaging elements moves together axially along the center axis of the drive shaft.

In one embodiment, when gear shifting is commanded, the rotator and the section with the four engaging elements always move first axially along the drive shaft. The gear shifting cycles is complete, when the section with the six engaging elements follows the axial movement of the first section+rotator.

In an alternative embodiment, when gear shifting is commanded, the section with the six engaging elements always move first axially along the drive shaft. The gear shifting cycles is complete, when the rotator and the section with the four engaging elements follows the axial movement of the section with the six engaging elements.

This motion pattern of these two embodiments, i.e. the two sections+rotator is recognized as a master/slave movement. When gear shifting is commanded in one embodiment, the master comprising the section comprising the four engaging elements and the rotator always moves initial and begins engaging with a new gear-ring. During the movement of the master, the slave (the section with the six engaging elements) still engages with the former gear-ring. When the master engages with the new gear-ring, the slave starts to move axially along the drive shaft and also starts to engage with the new gear-ring.

Alternatively, the rotator can be located with the slave section. In this embodiment, the master section comprises six engaging elements, whereas the slave section comprises two sections (i.e. a rotator comprising two engaging elements and a section comprising four engaging elements). When gear shifting is commanded, the master section with six engaging elements always move first axially along the drive shaft. The gear shifting cycles is complete, when the rotator and the slave section with rotator four engaging elements follows the axial movement of the first section. This motion pattern of the two sections+rotator is also recognized as a master/slave movement. When gear shifting is commanded, the master comprising the section comprising the six engaging always moves initially and begins engaging with a new gear-ring. During the movement of the master, the slave (the section with the rotator and four engaging elements) still engages with the former gear-ring. When the master engages with the new gear-ring, the slave starts to move axially along the drive shaft and also starts to engage with the new gear-ring. If for some reason during gear shifting, the gear tooth misaligns, then the rotator helps to accommodate this misalignment and thereby ensures a smooth gear shifting mechanism. The rotator is such designed that the engaging elements can rotate around the shaft, during shifting, from about 0° up to about 36° of rotation, to accommodate adjacent gear-ring tooth misalignment. This ensures a gear shifting system which can shift between all gears in the face gear efficiently.

The engaging elements composing the spinner have the capability of intermeshing, contacting, and engaging the adjacent and corresponding teeth of the face gear. The term "engaging elements" refers to the any element which can engage in the teeth of the face gear and perform a gear shift using the technology described in the present patent application. In a preferred embodiment the engaging elements are fixed engaging elements and/or rolling elements.

By fixed engaging elements are meant any engaging element which cannot rotate but can engage with the teeth of the face gear such as fixed teeth, and/or 3D non-rolling object. By 3D non-rolling object is meant an object which are not flat, as teeth normally are, but has a 3D shape for example a sphere, box-shape, or non-rotating ball. Examples of a 3D non-rolling object is ball dowel caps on a dowel pin. By fixed teeth is meant a flat or plane structure which can engage in the teeth of the face gear. The fixed teeth may have a pointy or sharp tip but may also have a round tip.

The engaging elements may also be rolling elements. The rolling elements may be any rolling elements, wherein an element is free to rotate about its rotational axis. Examples of rolling elements may be bushings, bearings, ball bearings, roller bearings and/or double row ball bearings. In a more preferred embodiment, the engaging elements are fixed teeth, 3D-non rolling objects, bushings, bearings, ball bearings, roller bearings and/or double row ball bearings. Most preferably, the roller elements are bushings, ball bearings, roller bearings, or double row ball bearings. If ball bearings, roller bearings or double row ball bearings are used as roller elements, then these are preferably composed of steel/alloy bearings, ceramic bearings, ceramic-hybrid bearings, other low-friction materials, or a combination of materials to produce rolling elements with the lowest friction possible.

If ball bearings are used as roller elements, then these are preferably composed of steel/alloy, ceramic bearings, ceramic-hybrid bearings, other low friction materials, or a combination of materials to produce roller elements with the lowest friction possible.

A conventional ball bearing comprises an outer raceway, an inner raceway and a plurality of balls located between the inner and outer raceway In one embodiment, the spinner, composing the pinion gear assembly, is designed such that a plurality of ball bearings is utilized as the roller elements.

In one embodiment, the spinner comprises at least two sections. Each section comprises each two spinner plates; an outer plate and an inner plate. A plurality of engaging elements is located between the outer and inner plates. The two plates engage the shaft of the center axis of each engaging element comprising the sections. This renders each roller element free to rotate around its center axis.

In an alternative embodiment, each section comprises two spinner plates; an outer and an inner plate. A plurality of roller elements is located between the outer and inner plates. The two plates engage the outer race of the roller elements. An axle pin connects the inner races of the roller elements and then engages a gear-ring.

The material of the spinner plates may be any suitable material. Preferably, the material of the plates is either metallic, or a plastic, or a composite, or combinations hereof.

In a preferred embodiment, the spinner is connected to a shifting drum. The shifting drum is also connected to the drive shaft and preferably located inside the drive shaft. The shifting drum helps facilitate the shifting of gears, but also to keep the spinner engaged with the face gear during bicycle riding. The design of the drum is unlike a traditional shifting drum because the drums outer surface has grooves which are formed and function as a 'hysteresis curve' and one-way gates. The 'hysteresis curve' and one-way gates are shown as radial slots and helix slots. This unique drum design helps facilitate gear shifting because it ensures that the split pinion gear assembly can move the at least two sections at different points axially along the length of the drive shaft.

In a preferred embodiment, the shifting drum is connected to a spinner which comprises two sections and a rotator.

Preferably, one section comprises six engaging elements, whereas the other section comprises four engaging elements, and the rotator comprises two engaging elements. The two sections act as a master-slave configuration. The master may comprise the section which comprises the four engaging elements and the rotator, whereas the slave may comprise the section with the six engaging elements. Alternatively, the master may comprise the section with the six engaging elements, whereas the slave may comprise the section which comprises the four engaging elements and the rotator. When gear shifting is initiated the master configuration always moves axially along the drive shaft and engages the new gear-ring first, whereas the slave configuration moves after the master and engages with the same gear-ring as the master. The drum design ensures that regardless of a clockwise or counterclockwise rotation of the drum, the master always moves first.

A normal drum design uses a simple helix or slotted drum design. This means that the order of movement of the two sections would be reversed, if the drum direction was reversed. In this unique drum design in which the shifting drum comprises one-way gates, the sequential master-slave movement is not reversed and are independent on the direction of the drum i.e. the master always moves axially before axially movement of the slave.

The face gear is connected to at least one power transmission component(s). The face gear comprises a cog-disk and at least two concentric gear-ring(s); By concentric gear-rings, it is meant concentrically disposed rings or circular paths of gear teeth where the rings are of different diameters.

The cog-disk is a disk which might be completely solid, or alternatively a solid disk with holes. The cog-disk may have any desired shape, preferably round or oval. The material of the cog-disk is preferably metal, but might be any suitable material, which is not easily breakable or deformable.

The gear-rings has a plurality of gear teeth and a plurality of tooth valleys.

In a preferred embodiment, the face gear comprises a cog-disk and a plurality of concentric gear-rings, and thereby has a plurality of concentrically disposed gear-rings, wherein the plurality of gear-rings has different diameters. The plurality of gear-rings having a plurality of gear teeth and a plurality of tooth valleys of identical or near identical geometry, however the gear-rings do not have the same number of teeth. The pinion gear assembly can be selectively positioned, fore and aft, along the longitudinal axis of the drive shaft, into a mesh state with any of the plurality of gear-rings on the front face gear as desired.

The face gear may comprise any number of desired concentric gear-rings; preferably, the number of concentric gear-rings is from about two to about twenty; more preferably, the number of concentric gear-rings is from about six to about eighteen; most preferably, the number of concentric gear-rings are from about ten to about fifteen.

In an embodiment of the invention, the cog-disk of the face gear comprises at least six concentric gear-rings, wherein the gear-rings maintains a three tooth increase per gear-ring.

In a preferred embodiment of the invention, the cog-disk comprises at least six concentric gear-rings, and wherein a gear-ring's tooth count is a multiple of three, and the gear-rings maintain a three tooth increase per gear-ring, and wherein the number of teeth on the gear-rings are listed in this table: 15-18-21-24-27-30-33-36-39-42-45-48-51-54. For example; if six gear-rings are located on the cog-disk, they may have the number of teeth 15-18-21-24-27-30; or 24-27-30-33-36-39; or 39-42-45-48-51-54.

In a most preferred embodiment of the invention, the cog-disk comprises fourteen concentric gear-rings, and wherein the gear-rings maintain a three tooth increase per gear-ring, so that the number of teeth on the gear-rings are: 15-18-21-24-27-30-33-36-39-42-45-48-51-54.

If the present invention is used on a bicycle, then the face gear comprises a rotational plane parallel to or near parallel to the rear wheel and a co-axial relationship to the rear wheel axle.

The drive shaft may be solid or hollow cross-section. Preferably, the cross section is hollow, which provides a drive shaft with as low weight as possible. Additionally, electronics and mechanisms for gear shifting and/or a power meter may be placed inside the hollow shaft.

The drive shaft may be constructed of alloy steel, aluminum, plastic, carbon fiber, or composite material.

The face gear comprises a cog-disk and at least one concentric gear-ring(s). Each gear-ring comprises a plurality of teeth and tooth valleys, wherein the teeth extend at an angle to a surface plane of the cog-disk in the range of about 0° to about 120°; preferably, from about 60° to about 100°; more preferably either 80°, 90°, or 100°; and most preferably 90°.

In a chain ring of a conventional bicycle chain drive, the angle between the teeth and surface plane is about 0°. In one embodiment, the axis of rotation of the engaging elements on the spinner are perpendicular to and intersecting the spinner axis of rotation, the engaging elements may then engage and mesh with a conventional chain ring.

In an alternative embodiment, the angle between the teeth and surface plane is approximately 90°, wherein the axis of rotation of the shaft drive and the engaging elements are parallel to the spinner axis, the engaging elements may then engage and mesh with the teeth of the face gear.

In yet an alternative embodiment, the angle between the teeth and surface plane of the cog-disk is approximately 45°, wherein the axis of rotation of the engaging elements on the spinner are at approximately 45° angle to and intersect the spinner axis, the engaging elements may then engage and mesh with the teeth of the face gear.

In an embodiment, the teeth on the face gear have identical geometry, and the tooth valleys on the face gear have identical geometry.

Each tooth of the gear-ring(s) has a height measured from the bottom of the tooth valley to the tooth tip. The dimensions of each tooth, i.e. the height and valley-to-valley length of the tooth are preferably configured to correspond closely to the dimensions of the engaging element engaging with the tooth, thereby reducing the frictional forces. The pitch of the teeth is dependent on the circumferential distance between each engaging element on the spinner and the radius of the gear-ring. The geometry and dimensions of the tooth valley are dependent on the geometry and dimension of the engaging elements. Preferably, the general shape of the cross-section of the engaging elements corresponds to the general shape of the tooth valley. This provides a meshing between the engaging elements and the teeth and tooth valleys, which reduces the friction.

In one embodiment, the rotational axis of the pinion gear assembly is coaxial to the drive shaft. This reduces the friction between the pinion gear assembly, drive shaft and the face gear.

In an embodiment, a shift controller initiates the desire to change gears.

The controller may be connected by cables, wires, or wirelessly to a gear selection device comprising an electromechanical actuator in proximity to the pinion gear assembly. The electromechanical actuator provides the force and mechanical action to move the pinion gear assembly to enable gear selection changes.

In a more preferred embodiment, the shift controller may be connected by cables, wires, or wirelessly to a gear selection device comprising an electrical motor and a gear box.

In one embodiment, the electromechanical gear-selection device is positioned inside of the drive shaft and connected to the gear shifting controller and the pinion gear assembly.

In a further embodiment, the electromechanical gear-selection device is positioned inside of the drive shaft and connected to the gear shifting controller and the spinner of the pinion gear assembly.

In a further embodiment, the electromechanical gear-selection device is positioned inside of the drive shaft and connected to the gear shifting controller and the sections composing the pinion gear assembly to enable gear selection changes.

In an embodiment of the invention, the bicycle system which activates and facilitate gear shifting, comprises a controller (which is an electronic print board which controls the motor. The motor helps facilitate gear shifting), a position sensor (which is an electronic print board, which is used to sensing the position of the drive shaft), a remote (which is a remote to activate or adjust gear shifting. The remote may be an external device or located within the bicycles handlebar), an actuator (which is a motor which turns the drum).

In one embodiment of the invention, the system is built from a wireless remote unit, that transmits commands for gear shift and gear adjustment to a rechargeable battery powered control and drive unit, located inside the drive shaft. The control unit is built from a wireless microcontroller unit, with precise actuator (motor) position control, and a relative gear position encoder, fitted on the actuator motor axle. When a gear shift is commanded, the controller turns the gear drum in two steps of about 180° each, the shift is triggered, based on the current axle position. The axle position is read by an absolute position sensor, fitted in the end of the drive shaft, measuring position relative to the bike frame, and used to calculate the correct shift position.

The rotation speed of the drive shaft, when a shift command is issued, may be used to calculate and add an offset to advance or retract the initiation of the shift, thus compensate for the motors mechanical delay, hereby allowing the shift to happen at identical positions, independent of the drive shafts rotational speed.

In one embodiment, the gear selection device's electromechanical actuator is connected by a linkage or screw drive to the pinion gear assembly and the actuator is located externally in relation to the shaft.

In an alternative embodiment, the gear selection device's electromechanical actuator, in a wireless configuration, is connected by a linkage or linear screw drive to the pinion gear assembly and the actuator is located internally within the drive shaft, preferably a hollow drive shaft. Batteries, which are used to power the electromechanical actuator, may also be located within the hollow shaft.

The electromechanical actuator linkage actuates the sections composing the pinion gear assembly to cause the sections to move axially fore and aft, changing the positions of sections relative to the gear-rings on the face gears to mesh and engage with discrete gear-rings on the face gear, depending on the desired gear to be selected.

If the present invention is used on a bicycle, then the bicycle rider can maintain pedaling rotation during the shifting of gears, and the sections composing the pinion gear assembly will move fore or aft between selected rear gear-rings at a point where tooth valleys on adjacent gear-rings align.

In an embodiment of the invention, gear shifting is performed by using at least one shift channel.

A 'shift channel' is created when the teeth of a number of concentric gear-rings on the face gear are aligned to form a shift channel of teeth valleys extending in a radial direction of the cog-disk.

In one embodiment of the invention, the face gear comprises at least one shift channel.

In a preferred embodiment, the face gear comprises at least three shift channels.

In a more preferred embodiment, the face gear comprises three shift channels.

In a further embodiment, the teeth are aligned to form multiple shift channels extending in different radial directions. In a preferred embodiment, the face gear comprises a cog-disk comprising three shift channels extending in different radial direction.

The number of gears shifted in one continuous fore-aft motion of the pinion gear assembly may depend on the velocity capability of the electromechanical actuator, force provided by the electromechanical actuator, and rotational speed of the drive shaft and split pinion gear assembly.

In one embodiment, if the face gear is designed with at least a single shift channel across all of the gear-rings, the bicycle rider, or automated control unit, can command a shift between the smallest diameter gear-ring and the largest diameter gear-ring. In other words, a shift could occur from the highest gear to the lowest gear at one time, with a single uninterrupted fore movement of the pinion gear assembly across all gear-rings.

Using a face gear with three or more shift channels are advantageous because this makes the shifting of the gear shifting system more efficient. A system with three shift channels can shift gears three times as fast as using a system with only one shift channel.

In one embodiment of the invention, if the face gear is designed with three shift channels across all the gear-rings. The three shift channels are distributed uniformly throughout the cog-disk. The operator, or automated control unit, can command a shift between as few as only two adjacent gear-rings at one time, rather than shift through all of the gear-rings at one time. That is, the pinion gear assembly can be moved the distance of two adjacent ring gears. To shift gears again, the pinion gear assembly will move after a one third of the cog-disk rotation, when the shift channel is again aligned with the pinion gear assembly. At this point, another specific number of gears can be shifted as determined by the operator or automated control unit.

In one embodiment of the invention, the teeth on the gear-rings on the cog-disk are placed to form three shift channels extending in different radial directions.

The shift channels may be unconnected and/or solid. The unconnected shift channels are created when the teeth of a number of concentric gear-rings on the face gear are aligned to form a shift channel of teeth valleys extending in a radial direction of the cog-disk. The teeth of the unconnected shift channels are not connected. This contrasts with the solid shift channels, wherein the teeth are connected and forms a solid channel. Both the unconnected and the solid shift channels have the same tooth geometry. The solid shift channels can be manufactured from the same material as the teeth. Solid shift channels may be used to help time the shift of the pinion gear assembly. For example, if an actuation to move a section occurs too soon or too late, the solid connected shift channel might help the split section to move more easily, if the split section has to 'slide' across the teeth, due to mis-timing of the actuation. The goal is to time the actuation of a section perfectly so that the sections split, and move axially, when they are rotationally opposite from the rear cog, and therefore not engaged with the rear cog. But if the actuation timing is too fast or slow, the actuation and subsequent movement of a section might occur when the section is still engaged. Thereby in this case, the solid channel will help.

In one embodiment of the invention, the shift channels are unconnected and/or solid. If the face gear comprises at least one shift channel(s), then the shift channels may be unconnected and/or solid.

In one embodiment of the invention, an electromechanical gear-selection device is positioned inside of the drive shaft and connected to the gear shifting controller and the pinion gear assembly.

In a preferred gear shifting method, the spinner comprises at least two sections.

Prior to a gear shifting command: All of the sections composing the spinner, and the engaging elements composing the sections, are within the same rotational plane and are engaging one gear-ring.

During the gear shifting process: The operator initiates a gear-shift command by using a shift controller. The controller pre-determines when an area dividing two sections composing the spinner will rotate through one of the shift channels of the cog. The incoming section to the shift channel is identified one shaft-rotation in advance. As the engaging elements of the identified section disengage from the cog, this section is moved in an axial direction (along the drive shaft) to the next rider-commanded gear-ring. After continued rotation of the spinner, comprising the now-split sections, this original section engages the new gear-ring. As the spinner rotates, and as the original section engages the new gear-ring, the other section(s) will subsequently disengage the original gear-ring. As the other sections disengage the original gear-ring, each section will move axially to the new position of the original section at the new gear-ring. After one full rotation of the spinner, all sections will move sequentially from alignment with one gear-ring, to an aligned state with another gear-ring.

After the gear shifting process: The gear shifting process has been completed and all of the sections composing the spinner, and the engaging elements composing the sections, are all within a single rotational plane and are engaging one gear-ring; the new gear-ring.

In a more preferred gear shifting method, the spinner comprises at least two sections and preferably two sections and a rotator.

Prior to a gear shifting command: All of the sections and rotator composing the spinner, and the engaging elements composing the sections, are within the same rotational plane and are engaging one and the same gear-ring.

During the gear shifting process: The operator initiates a gear-shift command by using a shift controller. The controller commands the master (i.e. one section and the rotator) to move axially along the length of the drive shaft, either upwards or downwards. After continued rotation of the spinner, comprising the now-split sections, this master engages the new gear-ring. As the spinner rotates, and as the master engages the new gear-ring, the slave will subsequently disengage the original gear-ring. As the slave disengage the original gear-ring, it will move axially to the new position of the master at the new gear-ring. After one full rotation of the spinner, all sections will move sequentially from alignment with one gear-ring, to an aligned state with another gear-ring. If for some reason gear tooth misalignment occurs during gear shifting, the rotator is such designed that the rotator can rotate around the shaft during shifting, from about 0° up to about 36° of rotation, to accommodate adjacent gear-ring tooth misalignment.

After the gear shifting process: The gear shifting process has been completed and all of the sections composing the spinner, and the engaging elements composing the sections, are all within a single rotational plane and are engaging one gear-ring; the new gear-ring.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

A specific embodiment of the present invention can be utilized as a gear shifting system on a bicycle. The present invention comprises a bicycle having the standard components such as wheels (2), crank arm (5), seat (10), and handlebars (9). These standard components are not modified by the invention (FIG. 1). According to the invention, standard frames (3) from different frame manufactures can be used with an elevated chain stay (30).

Figure 2:
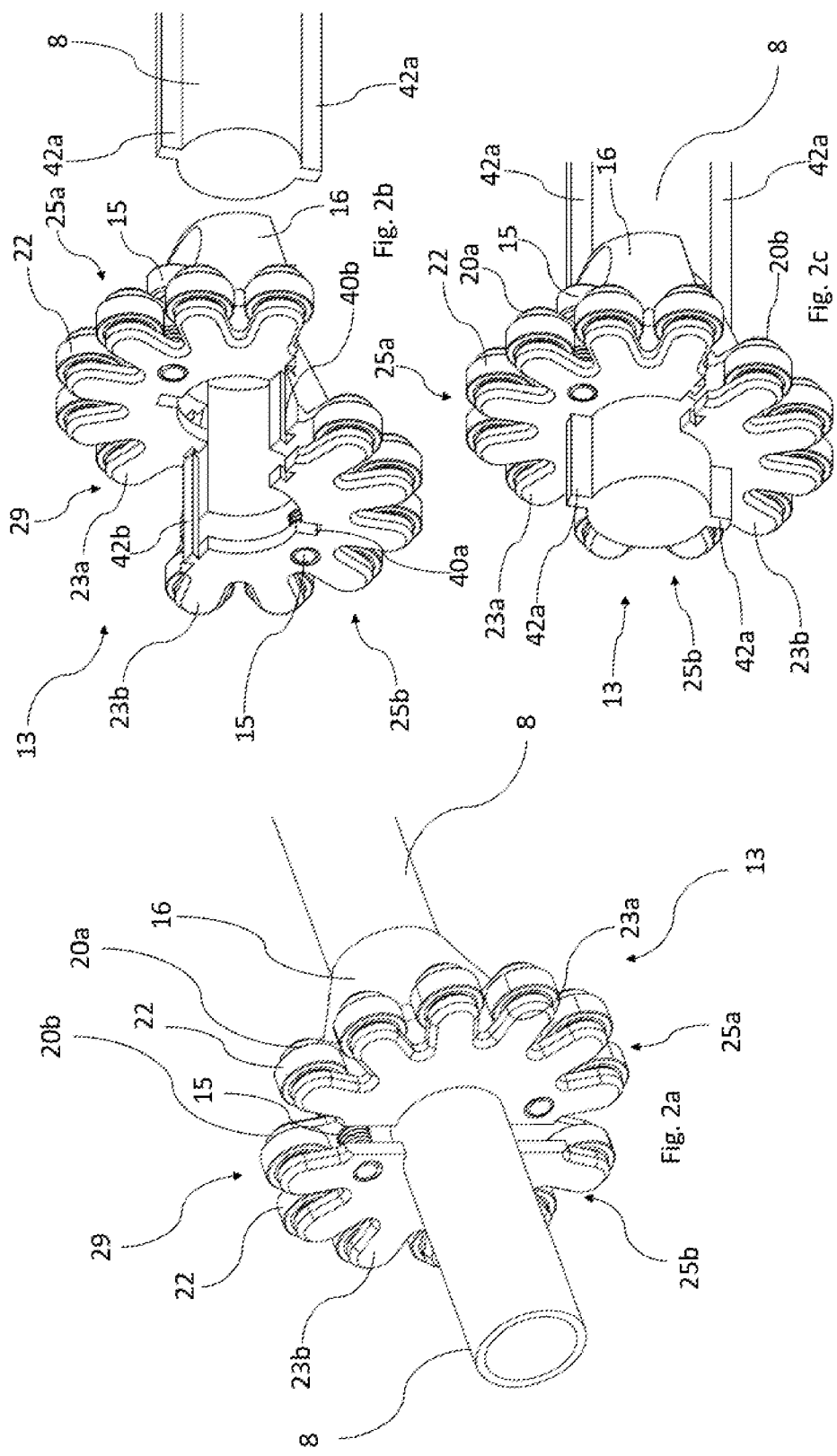

FIGS. 2a, 2b and 2c illustrate schematic drawings of an embodiment of the pinion gear assembly (13). FIG. 2a illustrates the pinion gear assembly (13) mounted on a drive shaft (8), whereas FIGS. 2b and 2c shows exploded views of the pinion gear assembly (13) components together with the drive shaft (8). The pinion gear assembly (13) comprises a connector (16). The connector (16) ensures that the pinion gear assembly (13) can be mounted on the drive shaft (8) but may also help to stabilize the pinion gear assembly (13) during use. The pinion gear assembly (13) comprises a spinner (29). The spinner (29) comprises two identical sections (25a, 25b). These two sections (25a, 25b) can move independently of each other to facilitate gear shifting. In this embodiment, the spinner (29) comprises two sections (25a, 25b), however the spinner may comprise any number of sections from two to any number of engaging elements located in the spinner (in this case from two to twelve). The number of desirable sections in each spinner is determined by the preferred shifting mechanism, but also which system or vehicle the gear shifting system is incorporated in. Each section (25a, 25b) comprises a plurality of engaging elements (22) and two spinner plates (20a, 20b), (23a, 23b). In this embodiment, each section (25a, 25b) comprises six engaging elements (22). The engaging elements (22) are placed between a spinner outer plate (20a, 20b) and a spinner inner plate (23a, 23b). The spinner inner plate (23a, 23b), the spinner outer plate (20a, 20b) and the engaging elements (22) are fastened together using fastening means (15). The fastening means may be any suitable fastening means that allow the inner and outer spinner plates to secure the engaging elements. In this embodiment, the two sections (25a, 25b) are joined by a joining method (42b) which provides circumferential stability, yet allows axial movement of the two sections (25a, 25b) relative to each other. Preferably, the section(s) (25a, 25b) joining means are a dovetail joint (42b).

The pinion gear assembly (13) is also connected to the drive shaft (8) using a connector (16) and spline/keyway engagement. Keyways (40a) are located on both the outer (20a, 20b) and inner (23a, 23b) plates of the sections (25a, 25b) and these engages the two splines (42a) placed on the drive shaft (8). Spline/keyway engagement ensures that the pinion gear assembly (13) will transfer or receive rotational torque to or from the drive shaft (8) during use and allow axial movement of the pinion gear assembly (13) with respect to the drive shaft (8).

In FIGS. 2a-2c, ball bearings are utilized as the engaging elements (22). However, any suitable engaging elements can be used such as either fixed engaging elements such as teeth, or ball dowel caps on a dowel pin; or rotatable engaging elements such as rolling elements such as bushings, roller bearings, and/or double row ball bearings. In this embodiment, the ball bearings used are conventional ball bearings comprising an outer raceway, an inner raceway and a number of balls located between the inner and outer raceway. The outer plate (20) and the inner plate (23) engages each of the inner raceways of the ball bearings (22). This renders the balls and outer raceway free to rotate around the inner raceway of the ball bearing.

Figure 3:
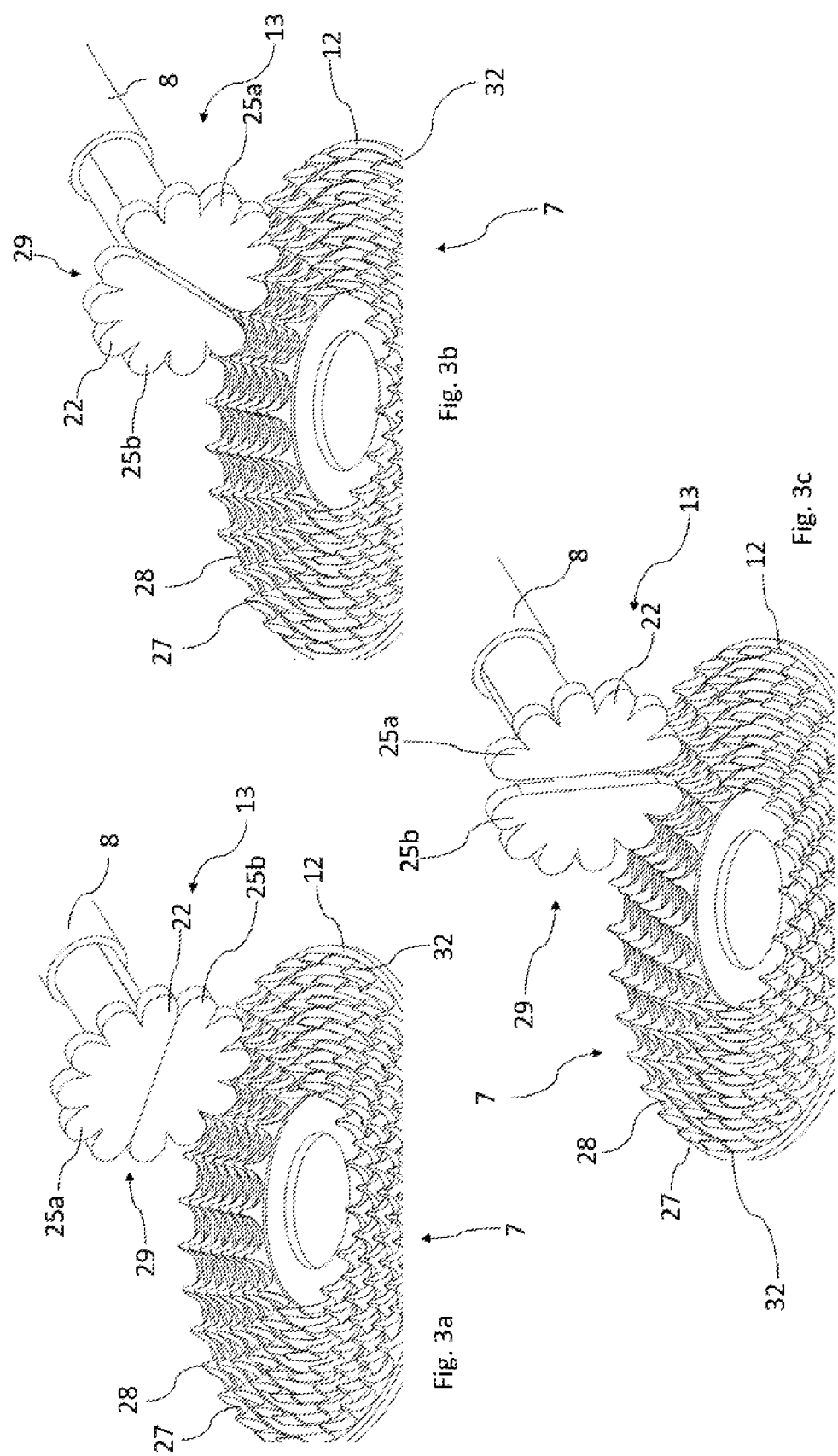
FIGS. 3a-3c shows a perspective view of a of a face gear engaged with the engaging elements of the spinner in the pinion gear assembly according to an embodiment of the invention.

FIG. 3 illustrates a schematic drawing of a different embodiment of the pinion gear assembly (13). In this embodiment, the pinion gear assembly (13) comprises a spinner (29), which comprises two identical sections (25a, 25b). Each section can move independently of each other to facilitate shifting of gears. The spinner (29) comprises two sections (25a, 25b), wherein each section comprises six engaging elements (22). The engaging elements are, in this embodiment, fixed metal teeth (22). Each section is composed of a metal plate wherein the fixed teeth are carved. However, the engaging elements (22) may also comprise fixed teeth depicted as spheres, squares, or any desirable geometry of the teeth. The spinner (29) may comprise any number of sections from two to any number of engaging elements located in the spinner (in this case from two to twelve). The number of desirable sections in each spinner is determined by the preferred shifting mechanism, but also which system or vehicle the gear shifting system is incorporated in.

FIGS. 3a-6 illustrates the pinion gear assembly (13) engaging in a cog-disk (12). In the specific embodiment, wherein the gear shifting system is mounted on a bicycle, then the pinion gear assembly (13) is engaging in a rear cog-disk (12). The rear cog-disk (12) is attached to the rear wheel (2b). The rotational force, provided by the bicycle rider, while pedaling, is transferred to the rear wheel (2b). The drive system (4) transfers energy from the bicycle pedals to the rear wheel (2b). The drive system (4) comprises a drive shaft (8). A pinion gear assembly (13) is attached to the first end of the drive shaft (8), and at least one power transmission component(s) which is coupled to the second end of the drive shaft (8). The power transmission component may be pedals, engine or a motor (either electrical or fuel-driven).

In FIG. 3a, the gear operator (or bicycle rider) uses one of the gears on the cog-disk (12) of the face gear, i.e. the spinner (29) is spinning in one of the concentric gear-rings (32). FIGS. 3b and 3c illustrates the gear shifting mechanism; When the operator wants to change gears, he initiates the shifting by electronic or mechanical means. This causes the spinner to split in at least two sections (25a, 25b). Section (25a) is still engaging in the same concentric gear (32a) as before the gear shifting mechanism was activated, whereas the other section (25b) is moving either to a higher or lower gearing. In this specific example, the section (25b) is moving to a higher gearing. In the instance that the section (25a) starts to move and start to engage with another concentric gear-ring (32b), then the other section (25b) start to disengage with the gear-ring (32a) and hereafter follow the first section (25a) to the gear-ring (32b). This then completes the gear shift and the machine or bicycle is now operating in a different gear.

Figure 4:
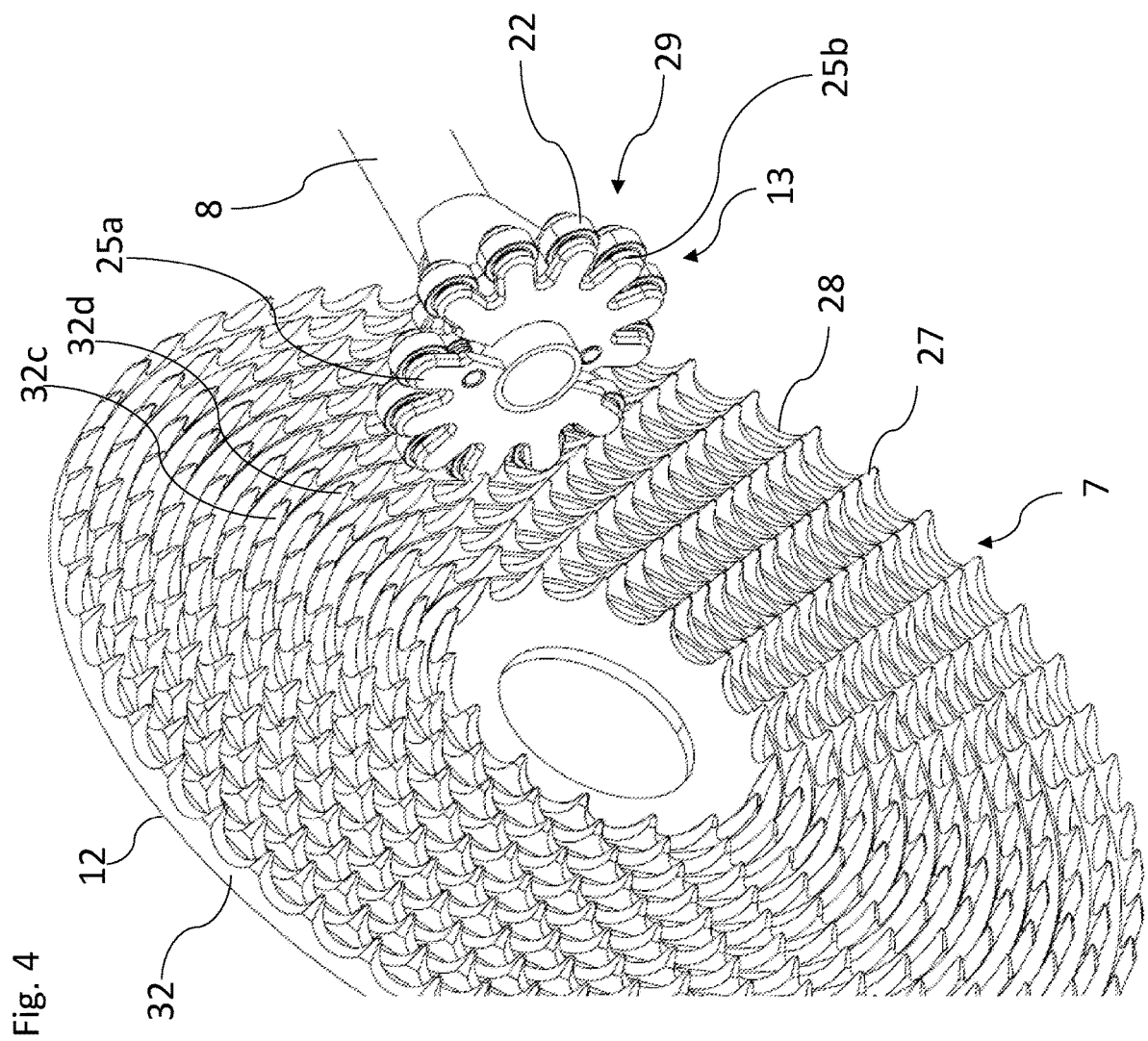
FIG. 4 shows a perspective view of a of a face gear engaged with the engaging elements of the spinner in the pinion gear assembly according to an embodiment of the invention.
Figure 5:
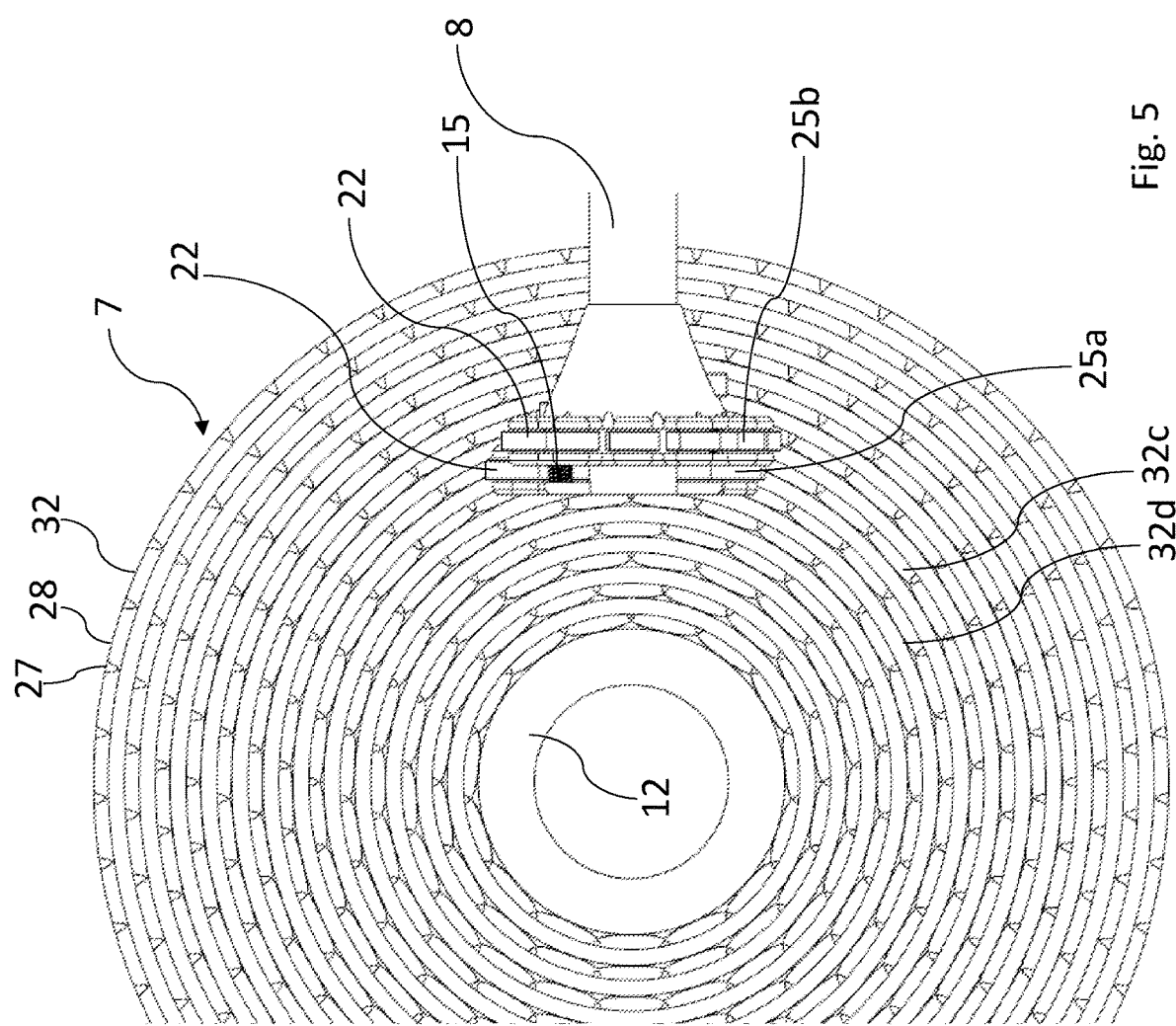
FIG. 5 shows a side view of a face gear engaged with the engaging elements of the spinner in the pinion gear assembly according to an embodiment of the invention.

Both FIGS. 4 and 5 illustrate a schematic drawing of one embodiment of the pinion gear assembly (13) engaging in a multi-gear face gear (7) during the gear shifting mechanism. The difference between FIG. 4 and FIG. 5 is the angle from which the spinners (29) engagement with the cog-disk (12) is depicted. A cog-disk (12) with thirteen concentric gear-rings (32) are shown. The spinner (29) comprises the features as illustrated and described in FIG. 2. Before the gear shifting mechanism was initiate the spinner (29) was engaging the cog-disk at the seventh concentric gear-ring (32c) from the center of the disk. That is, all of the sections, and all of the engaging elements composing the sections, are located within the same rotational plane. When gear shifting is initiated, at least one section (25b) is still engaging (and transferring power to or from) the seventh gear-ring (32c), whereas at least one other section (25a) moves axially (relative to the drive shaft axis). This other section (25a) moves as to enter into the path of alignment with the new gear-ring (32d). As the shaft and split pinion gear assembly (13) continues to rotate, the other section (25a), which is now aligned to the new gear-ring (32d), will engage in the new gear-ring (32d) on the face gear (7) as the shaft and split pinion gear assembly continue to rotate. As the initial section(s) (25b) disengage with the initial gear-ring (32c), the initial section (25b) will move axially, in the similar direction of the other sections (25a) which have already moved axially. Within one shaft rotation, all of the initial section(s) (25b) will have disengaged the initial gear-ring (32c) of the face gear (7), and subsequently moved axially to follow the other section(s) (25a) to become aligned, and engaged with, the new gear-ring (32d). At this point all of the engaging elements (22) composing the sections (25a, 25b) have moved, and have aligned with, the new gear-ring (32d), and are again located within the same rotational plane. At this point, the gear shifting is finalized and complete, and normal operation returns to the gear system.

As shown in FIGS. 3a-8 the face gear (7) has a cog-disk (12). The face gear (7) are designed to have a cog-disk (12) and at least two concentric gear-ring(s) (32); Each gear-ring (32) has a plurality of teeth (27). Next to each tooth (27), a tooth valley (28) is present. The number of teeth in each concentric gear-ring (32) can vary and is dependent on the diameter of the cog-disk (12) and the gear-ring (32). As shown in FIGS. 3a-8, all of the teeth (27) and tooth valleys (28) has the same geometry and size. The engaging elements (22) are engaging the teeth (27) and tooth valleys (28) of the face gear (7). The face gear is designed, such that the teeth (27) are placed at an angle to the cog-disk surface. The angle between the teeth (27) and cog-disk (12) surface is preferably 90°, but may alternatively be from about 0° to about 120°.

The teeth (27) of each gear-ring (32) are such designed that the engaging elements (22) fits into the tooth valleys (28). The tooth profile and the profile of the engaging elements are designed so that the interaction between the teeth (27) and the engaging elements (22) is of a rolling nature and friction is minimized or at least reduced considerably. This ensures a very high efficient drive system with a minimal level of friction, but also an easy and quick shifting mechanism which does not lag. The tooth profile is dependent on the size and shape of the engaging elements (22). The tooth profile is designed such that the engaging elements (22) fits into the tooth valleys as shown in FIGS. 3a-7. By fitting together means that the shape and size of the tooth valleys (28) corresponds in a similar manner to the complementary shape and size of the engaging elements. It is important that the engaging elements do not bind and do not create mechanical interference to the teeth (27) and tooth valleys (28) during meshing. Binding and interference of the engaging elements on the teeth and tooth valleys can cause damage to the engaging elements and/or a bad shifting performance. When the teeth mesh and engage with the engaging elements, the teeth apply a force to the engaging elements. This force line can be slightly off center, then center, and again off center, as the engaging elements engages and disengages the tooth. To eliminate the binding of the engaging elements on the teeth and tooth valleys, the correct tooth shape, pitch and tooth beveling is very important.

FIGS. 3a-8 illustrate a multi-gear rear face gear (7). In these figures, the drive shaft (8) is not shown in its full length. The multi-gear rear face gear (7) comprises a cog-disk (12) with a multiple number of concentric gear-rings (32). In the embodiment shown in FIGS. 3a-3c, the cog-disk comprises eight concentric gear-rings, whereas the cog-disk in FIG. 6 has six concentric gear-rings, which is in contrast to all of the other embodiments wherein the cog-disk (12) has thirteen concentric gear-rings (32). However, in all of the embodiments illustrated in FIGS. 3a-8, the cog-disk (12) could have any number of desired gear-rings for example from two to thirty. If the gear shifting system is used on a bicycle, then the face gear (7) comprises a rear cog-disk (12) having a rotational plane parallel to the rear wheel (2b) and co-axial relationship to the rear wheel axle. On the bicycle the gear shifting system can be used either on the front face gear and/or the rear face gear.

In the figures, the pinion gear assembly's spinner (29) is meshed and engaged with the concentric gear-ring (32) with a middle-sized diameter. Each gear-ring(s) (32) comprises a fixed number of teeth (27) and tooth valleys (28). As the shown embodiment in FIG. 7, the smallest gear-ring (32c) size comprises fifteen teeth, whereas the largest cog size comprises fifty-one teeth (32a). This means that the gear-ring maintains a three tooth increase per gear-ring.

When the drive system (4) is in motion, the ball bearings (22) in the spinner (29) in the pinion gear assembly (13) mesh and engage the teeth (27) of the face gear (7). More specifically, the outer raceway of a ball bearing engages with a tooth tip (34) and subsequently a tooth valley (28), as both the raceway and teeth mesh together, which results in the ball bearing (22) rotating. This rotation of the ball bearings ensures that the amount of friction generated, during meshing, between the face gear teeth (27) and the pinion gear assembly (13) is a minimum. This result is an overall lower amount of energy wasted as a result of friction.

When the rider or operator wants to shift gears, the gear shifting system may utilize a shift channel to smoothen the gear-shift performance. Using a shift channel might enhance the experience of shifting, so that the system does not lag.

Figure 6:
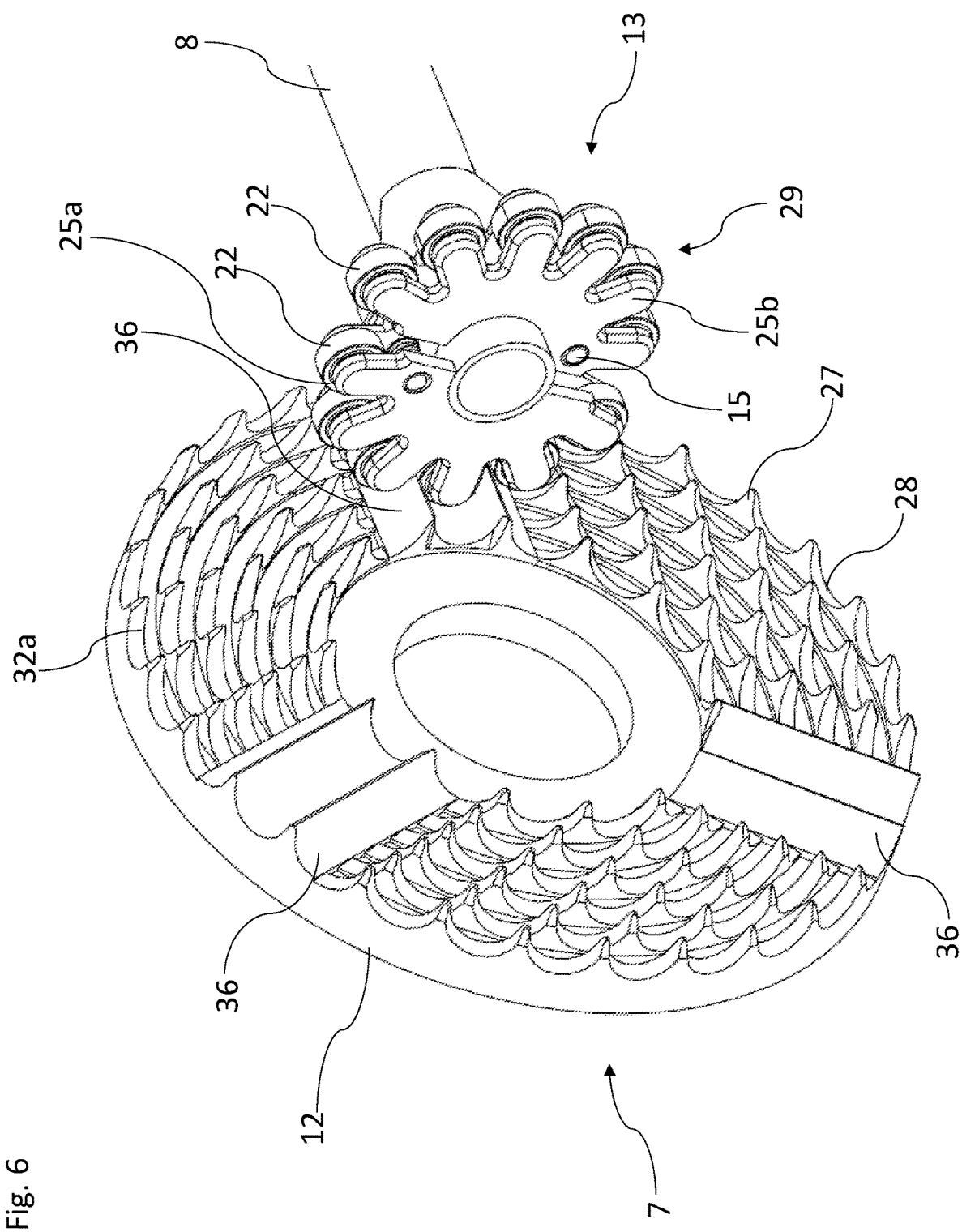
FIG. 6 shows a perspective view of a face gear engaged with the engaging elements of the spinner in the pinion gear assembly according to an embodiment of the invention.
Figure 7:
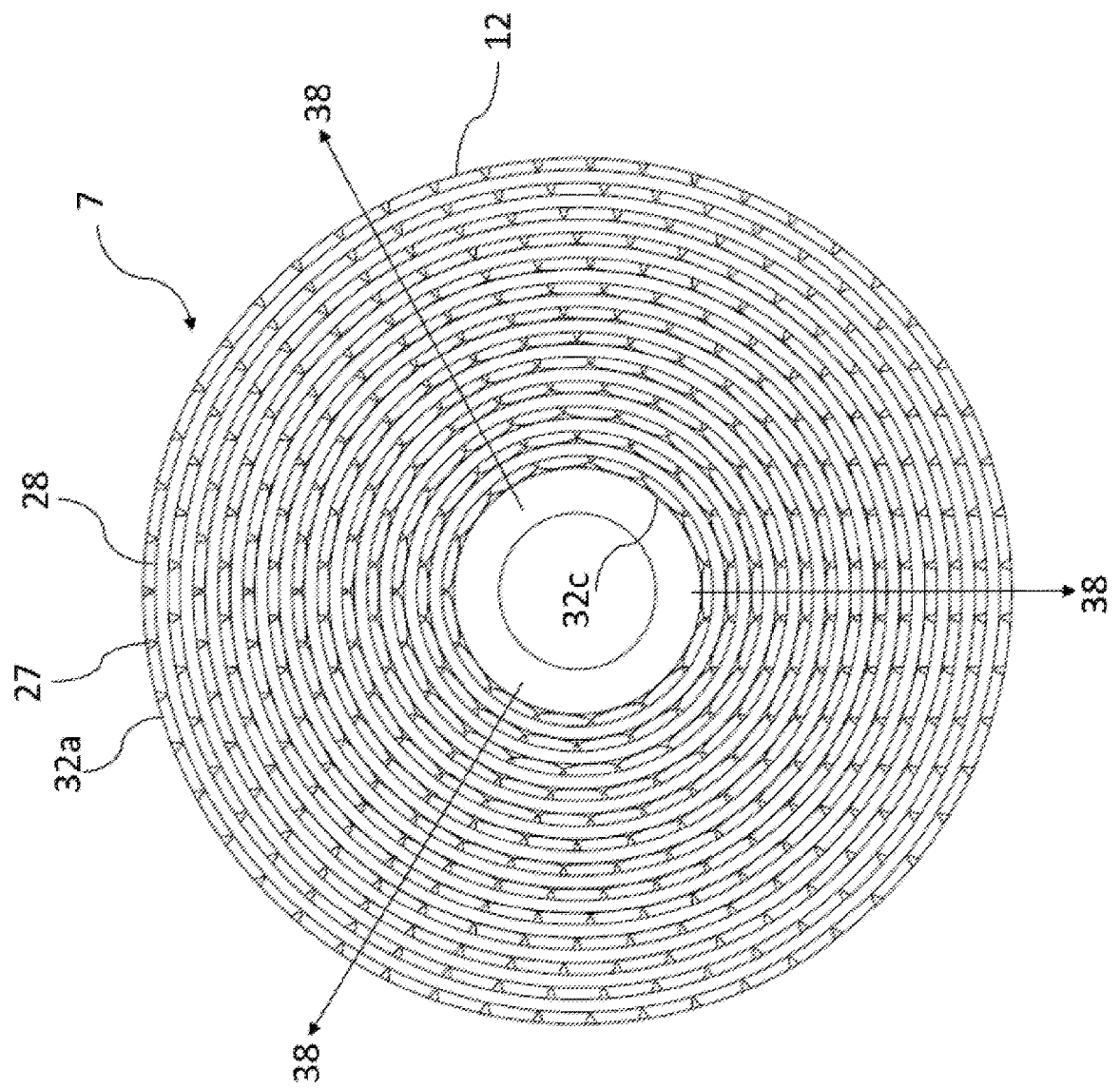
FIG. 7 illustrates a side view of three unconnected shift channels on the multi-gear face gear according to an embodiment of the invention.
Figure 8:
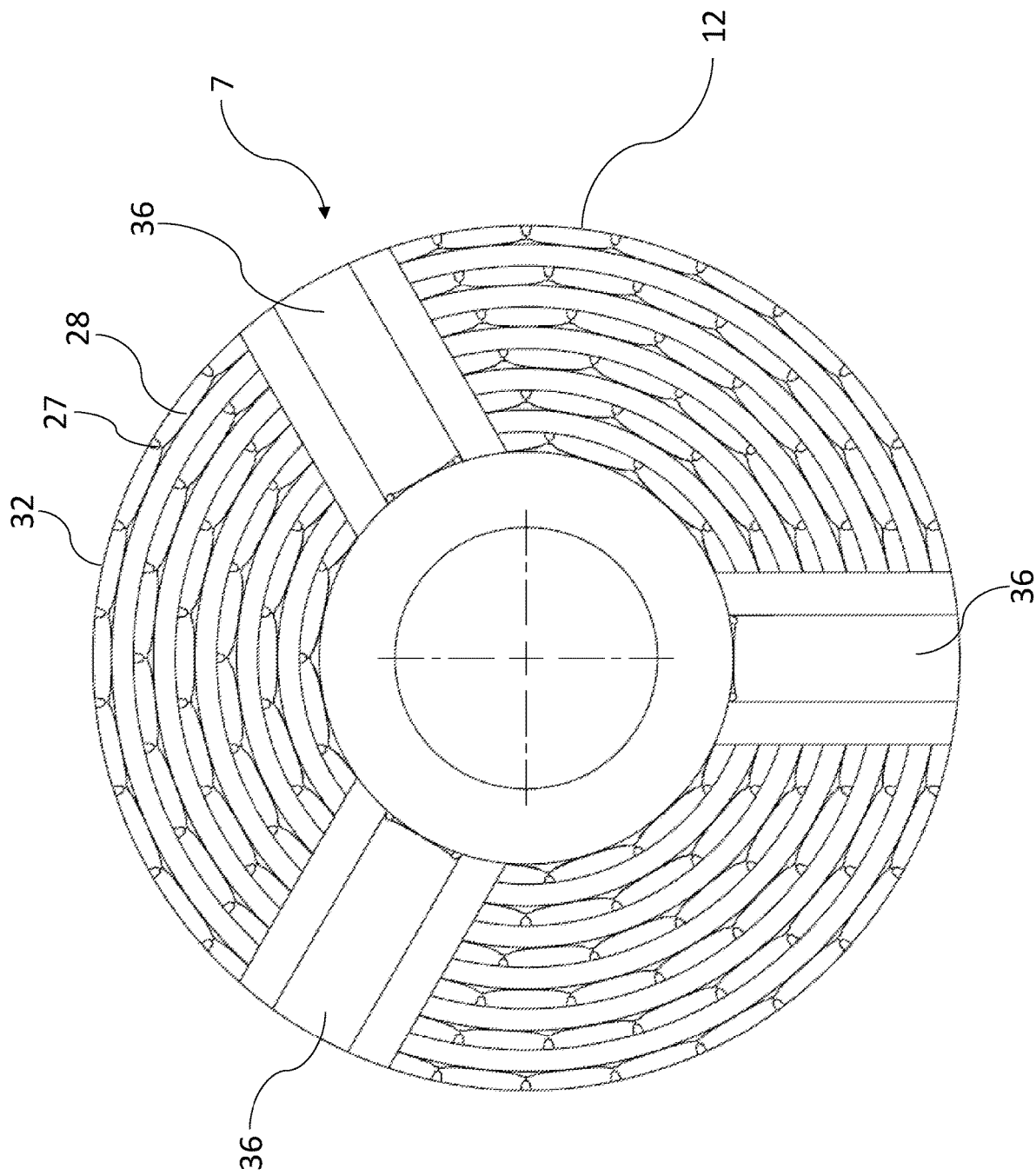
FIG. 8 illustrates a side view of three solid shift channels on the multi-gear face gear according to an embodiment of the invention.

Using a face gear with fourteen gear-rings, wherein the smallest gear-ring has thirteen teeth and the largest has fifty-four teeth results in one specific shift channel. However, using instead a face gear with thirteen gear-rings, wherein the smallest gear-ring has fifteen teeth and the largest gear-ring has fifty-one teeth results in a face gear with three shift channels, wherein the gear-rings maintain a three tooth increase per gear. A face gear comprising three shift channels are shown in FIG. 7. The arrows illustrate the three shift channels (38). The shift channels are created by specific alignment of adjacent gear-rings on the cog-disk (12). The shift channels are created when a plurality of concentric gear-rings (32) adjacent to each other are aligned on the cog-disk (12) in a manner such that the tooth valleys (28) of one or more adjacent gear-rings are aligned in a radial manner. In contrast to the shift channels (38) displayed in FIG. 7, solid shift channels (36) as shown in FIGS. 6 and 8 can also be used. Solid shift channels (36) function the same way as the unconnected shift channels (38) displayed in FIG. 7. Both the solid shift channels and the unconnected shift channels have the same tooth geometry. The solid shift channels can be manufactured from the same material as the rest of the teeth and cog-disk. Both solid shift channels and unconnected shift channels can be used for good shifting properties of the gear shifting system.

Shifting can occur when an engaging element (22) is midway through the meshing cycle and the engaging element is positioned at the bottom of the tooth valley (28) in the unconnected (38) or solid shift channel (36). At this point, the pinion gear assembly (13) comprising the engaging elements (22) can be slid fore/aft between adjacent gear-rings (32), through the shift channel of aligned tooth valley(s). Solid shift channels may advantageously help to time the split pinion gear assembly (i.e. when the two sections (25a, 25b), of the spinner (29), disengage and moves independently from each other). For example, if a split occurs too soon or too late, the solid connected shift channels might help the split if it has to 'slide' across the teeth. The solid shift channel may then help if the split occurs when the splitting section is still engaged. This may happen if the split is too fast or slow.

Using a gear shifting system with three shift channels (either solid or unconnected) instead of one is more advantageous, because this will make the system more efficient and the operator will not experience that he needs to wait for the spinner to engage with a shift channel before the gear shift can occur.

FIGS. 9-15 illustrates an alternative embodiment of a gear shifting sequence of the pinion gear assembly (13). The pinion gear assembly (13) is connected to a drive shaft (8), however the drive shaft (8) is not depicted on any of the FIGS. 9-15. The spinner (29) of the pinion gear assembly (13) engages in a multi-gear rear face gear (7). The multi-gear rear face gear (7) comprises a cog-disk (12) with a multiple number of concentric gear-rings (32). In the middle of the multi-gear rear face gear (7), a fastening means (42) is placed, which helps fastening the cog to the hub on the bicycle. In FIGS. 10-15, the multi-gear rear face gear (7) is not shown in its full size.

In FIGS. 9-15, the pinion gear assembly comprises a spinner (29). The spinner (29) comprises three sections (25a, 25*b*, 40). The section (40) is also called a rotator and comprises two engaging elements, which preferably are ball bearings (22). Section (25*a*) comprises four engaging elements whereas section (25*b*) comprises six engaging elements, both sections (25*a*, 25*b*) preferably comprises ball bearings as engaging elements (22). When gear shifting is commanded, the master always moves first axially along the drive shaft (8) (in this embodiment, the master comprises section (25*b*)), whereas the slave always moves second axially along the drive shaft (8) (in this embodiment, the slave comprises section (25*a*) and the rotator (40)). In contrast to the two sections (25*a*, 25*b*), the rotator (40) is such designed that it can rotate around the drive shaft during shifting, from about 0° up to about 36° of rotation, to accommodate adjacent gear-ring tooth misalignment.

Both section (25*a*, 25*b*) comprises fastening means (15) to fastening the pinion gear assembly (13) to the drive shaft (8).

Figure 9:
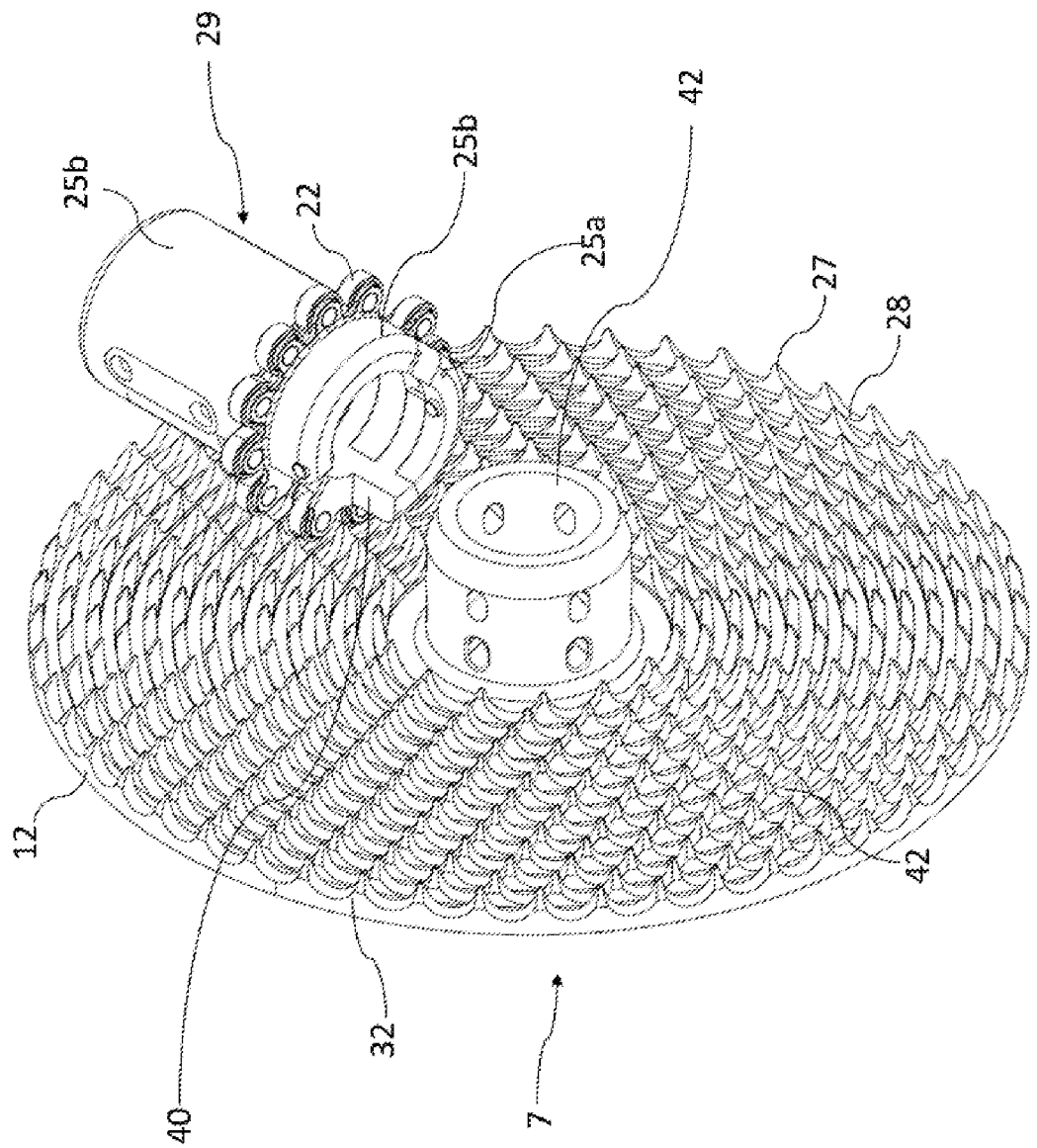
Figure 13:
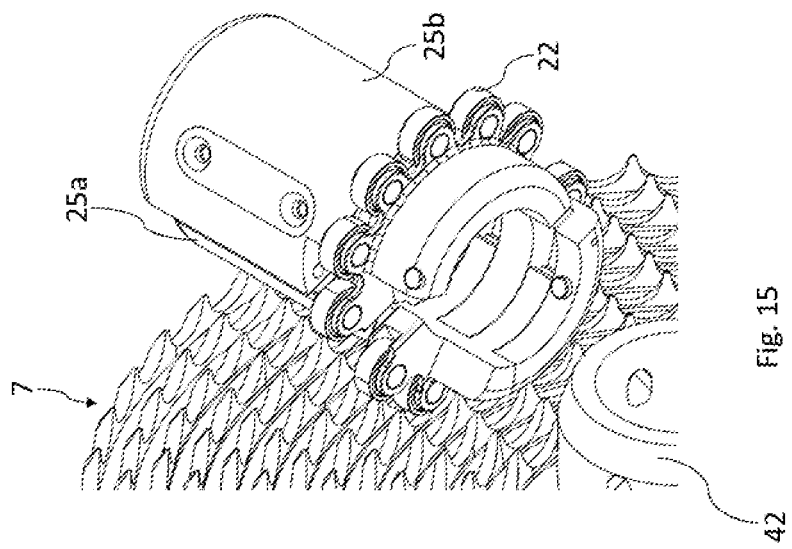
Figure 14:
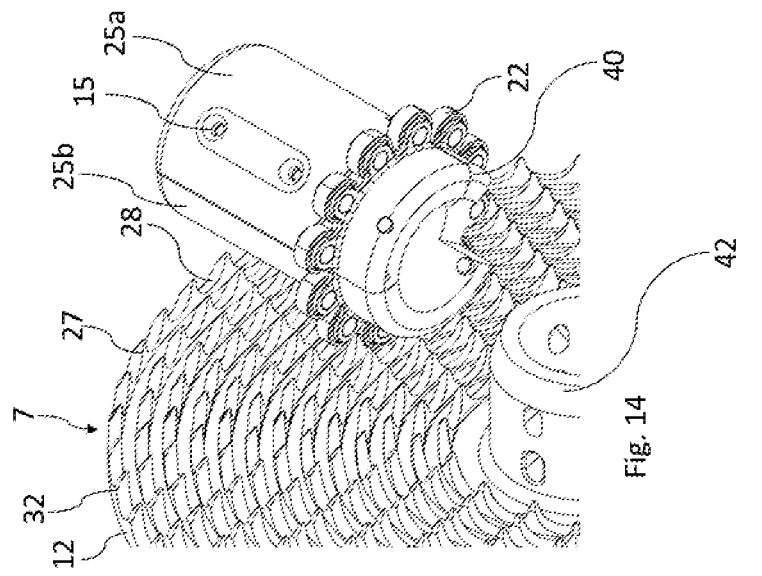
Figure 15:
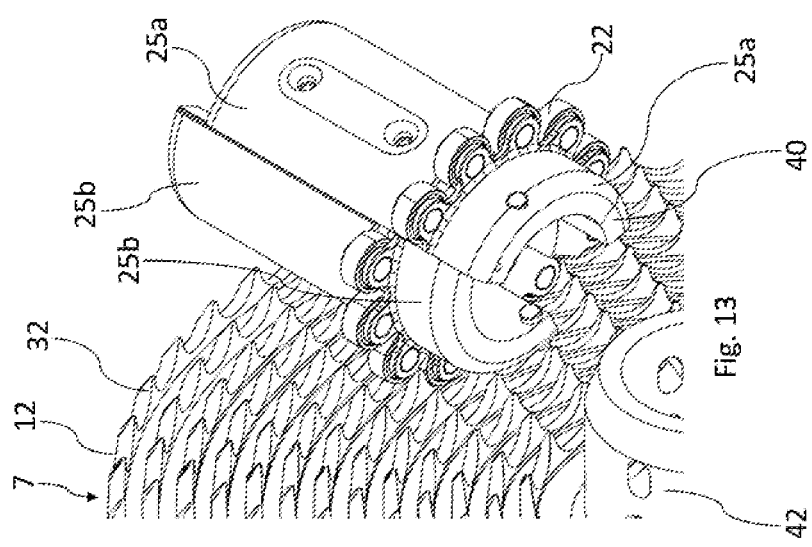

FIG. 9 illustrates a pinion gear assembly (13) which engages in the fifth gear-ring counted from the center of the cog (12). When gear shifting is commanded, master (section (25*b*)) moves axially along the drive shaft (8) to either shift the pinion gear upwards or downwards on the rear face gear (7), as illustrated in FIG. 10. After the movement along the drive shaft (8), the engaging elements (22) of the master (section (25*b*)) engages the new gear-ring (in this case the sixth gear-ring counted from the center of the cog (12)), as illustrated in FIGS. 10-12. Before the master (section (25*b*)) engages with the new gear-ring, the rotator rotates around the drive shaft axis (8) to accommodate gear tooth misalignment. The rotation of the rotator is illustrated in FIGS. 10 and 11. The rotator (40) can rotate around the drive shaft (8), during shifting, from about 0° up to about 36° of rotation. To accommodate gear tooth misalignment, the rotator (40) and the master (section (25*b*)) both at the same instant in time engages, in this example, the fifth gear-ring and the sixth gear-ring. Hereafter the rotator (40) rotates in the opposite direction and reconnects with the section (25*a*), as shown in FIG. 12. The slave (the rotator (40) and section (25*a*)) then moves together axially along the axis of the drive shaft (8), as shown in FIG. 13 and engages with the new gear-ring. As illustrated in FIGS. 14 and 15, the gear shifting mechanism is complete, and illustrates the spinner (29) of the pinion gear assembly (13) engaging in the sixth gear-ring. Hereafter a new gear shifting command can now be initiated.

FIGS. 16*a*-16*c* illustrate a drum (44) in connection with section (25*a*), section (25*b*) and the rotator (40). Three pins (48*a*, 48*b*, 48*c*) engages the drum (44) at all times to ensure that the pinion gear assembly (13) does not disengage from the rear face gear (7) during bike riding.

The drum comprises a plurality of one-way gates (50). Each one-way gate (50) comprises two grooves (46*a*, 46*b*). The two grooves (46*a*, 46*b*) ensures that the master always moves first, and the slave always moves second regardless of a clockwise or counterclockwise rotation of the drum. The movement of the three sections (25*a*, rotator, 25*b*) on the drum (44) during gear shifting shows a hysteresis curve.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A gear shifting system (4) comprising a drive shaft (8), the drive shaft (8) being configured for connecting a face gear (7) and at least one power transmission component(s) (6) of the gear system, the gear system comprising: at least one power transmission component(s) (6) which is coupled to the second end of the drive shaft (8); a face gear (7) comprising a cog-disk (12) and at least one concentric gear-ring(s) (32); and a drive shaft (8) having an axis of rotation and having a first end of the drive shaft and a second end, wherein the drive shaft comprises: a pinion gear assembly (13) coupled to the first end of the drive shaft in which the pinion gear assembly is configured to mesh with one of the concentric gear-rings (32) on the face gear (7), so that the rotational movement of the gear-ring (32) is transmitted to the shaft (8), wherein the pinion gear assembly (13) comprises one or more engaging elements (22), wherein the one or more engaging elements (22) of the pinion gear assembly (13) is engaging one of the concentric gear-rings (32) of face (7) gear, and wherein the pinion gear assembly (13) comprises at least two split sections (25) of a spinner (29).

Illustration 2. A gear shifting system according to any of the preceding or subsequent illustrations or combination of illustrations, wherein the pinion gear assembly (13) comprises any number of sections (25) from two to as many as the number of engaging elements (22) in the spinner (29).

Illustration 3. A gear shifting system according to any of the preceding or subsequent illustrations or combination of illustrations, wherein the pinion gear assembly (13) comprises two to twelve sections (25).

Illustration 4. A gear shifting system according to any of the preceding or subsequent illustrations or combination of illustrations, wherein the pinion gear assembly (13) comprises at least two sections (25) which move independently of each other.

Illustration 5. A gear shifting system according to any of the preceding or subsequent illustrations or combination of illustrations, wherein the pinion gear assembly (13) comprises at least two sections (25) wherein all the sections (25) have the same number of engaging elements (22).

Illustration 6. A gear shifting system according to any of the preceding or subsequent illustrations or combination of illustrations, wherein the power transmission component is a front face gear (6), which is connected to pedals on a bicycle and/or a motor.

Illustration 7. A gear shifting system according to any of the preceding or subsequent illustrations or combination of illustrations, wherein the power transmission component is a front face gear (6), which is connected to pedals on a bicycle.

Illustration 8. A gear shifting system according to any of the preceding or subsequent illustrations or combination of illustrations, wherein the engaging elements (22) are fixed engaging elements and/or rolling elements.

Illustration 9. A gear shifting system according to any of the preceding or subsequent illustrations or combination of illustrations, wherein the engaging elements (22) are fixed teeth, 3D-non rolling objects, bushings, bearings, ball bearings, roller bearings and/or double row ball bearings.

Illustration 10. A gear shifting system according to any of the preceding or subsequent illustrations or combination of illustrations, wherein the face gear (7) comprises a number of gear-rings (32) and wherein the teeth (27) in at least some of the rings (32) are placed so as to form a shift channel (38) of teeth valleys (28) extending in a radial direction of the cog-disk (12).

Illustration 11. A gear shifting system according to any of the preceding or subsequent illustrations or combination of illustrations, wherein the teeth (27) are placed to form at least three shift channels (36, 38) extending in different radial directions.

Illustration 12. A gear shifting system according to any of the preceding or subsequent illustrations or combination of illustrations, wherein the shift channels (36, 38) are unconnected and/or solid.

Illustration 13. A gear shifting system according to any of the preceding or subsequent illustrations or combination of illustrations, wherein the cog-disk (12) comprises at least tix concentric gear-rings, and wherein the gear-rings maintains a three tooth increase per gear-ring.

Illustration 14. A gear shifting system according to any of the preceding or subsequent illustrations or combination of illustrations, wherein the cog-disk (12) comprises at least tix concentric gear-rings, and wherein the gear-rings maintains a three tooth increase per gear-ring, and wherein the number of teeth on the gear-rings are listed in this table: 15-18-21-24-27-30-33-36-39-42-45-48-51-54.

Illustration 15. A gear shifting system according to any of the preceding or subsequent illustrations or combination of illustrations, wherein the pinion gear assembly (13) comprises a spinner (29), and the spinner (29) has engaging elements (22) uniformly distributed at a radial distance from the center.

Illustration 16. A gear shifting system according to any of the preceding or subsequent illustrations or combination of illustrations, wherein one or more gear-rings (32) of the face gear (7) comprises a plurality of teeth (27) and tooth valleys (28), wherein the teeth (27) extend at an angle to a surface plane of the cog-disk (12) in the range of 0° to 120°.

Illustration 17. A gear shifting system according to any of the preceding or subsequent illustrations or combination of illustrations, wherein an electromechanical gear-selection device is positioned inside of the drive shaft (8) and connected to the gear shifting controller and the pinion gear assembly (13).

Illustration 18. A method of shifting gears, the method comprising a gear shifting system according to any of the preceding or subsequent illustrations or combination of illustrations: before gear shifting is initiated, all of the sections (25) are engaging the same gear-ring (32c) on the face gear (7); when gear shifting is initiated, at least one section (25a) is still engaging the initial gear-ring (32c), whereas at least one other section (25b) moves axially, and in which this other section (25b) moves as to enter into the path of alignment with the new gear-ring (32d); as the shaft (8) and pinion gear assembly (13) continues to rotate, the other section (25a), which is now aligned to the new gear-ring (32d), will engage in the new gear-ring (32d) on the face gear (7) as the shaft (8) and pinion gear assembly (13) continue to rotate; as the initial section(s) (25a) disengage with the initial gear-ring (32c), the initial section (25a) will move axially, in the similar direction of the other sections (25b) which have already moved axially; within one shaft rotation, all of the initial section(s) (25a) will have disengaged the initial gear-ring (32c) of the face gear (7), and subsequently moved axially to follow the other section(s) (25b) to become aligned, and engaged with, the new gear-ring (32d); and at this point all of the engaging elements (22) composing the sections (25) have moved, and have aligned with, the new gear-ring (32d), and are again located within the same rotational plane; and at this point, the gear shifting is finalized and complete, and normal operation returns to the gear system.

Illustration 19. A bicycle gear shifting system comprising a drive shaft (8), the drive shaft (8) being configured for connecting a front face (6) and rear face (7) gear of the bicycle drive system (4), the bicycle drive system comprising: a front face gear (6) comprising a cog-disk (11) and at least one concentric gear-ring(s) (32); and a rear face gear (7) comprising a cog-disk (12) and at least one concentric gear-ring(s) (32); and a drive shaft (8) having an axis of rotation and having a first end of the drive shaft and a second end, and wherein the drive shaft further comprises a pinion gear assembly (13) coupled to the first end of the drive shaft and/or a pinion gear assembly (13) is coupled to the second end of the drive shaft in which the pinion gear assembly is configured to mesh with one of the concentric gear-rings (32) on the front face gear (6) or the rear face gear (7), so that the rotational movement of the gear-ring (32) is transmitted to the shaft (8), wherein the pinion gear assembly (13) comprises one or more engaging elements (22), wherein the one or more engaging elements (22) of the pinion gear assembly (13) is engaging one of the concentric gear-rings (32) of rear face (7) gear and/or of the front face gear (6), and wherein the pinion gear assembly (13) engaging the rear face (7) gear and/or of the front face gear (6) comprises at least two split sections (25) of a spinner (29).

Illustration 20. A gear shifting system comprising a drive shaft (8), the drive shaft (8) being configured for connecting a face gear (7) and at least one power transmission component(s) (6) of the gear system, the gear system comprising: at least one power transmission component(s) (6) which is coupled to the second end of the drive shaft (8); and a face gear (7) comprising a cog-disk (12) and at least one concentric gear-ring(s) (32); and a drive shaft (8) having an axis of rotation and having a first end of the drive shaft and a second end; and wherein the drive shaft further comprises a pinion gear assembly (13) coupled to the first end of the drive shaft in which the pinion gear assembly is configured to mesh with one of the concentric gear-rings (32) on the face gear (7), so that the rotational movement of the gear-ring (32) is transmitted to the shaft (8); in which the pinion gear assembly (13) comprises one or more engaging elements (22); and the one or more engaging elements (22) of the pinion gear assembly (13) is engaging one of the concentric gear-rings (32) of face (7) gear; characterized by the pinion gear assembly (13) comprises a spinner (29), wherein the spinner (29) comprises at least 2 sections (25) and a rotator (40).

Illustration 21. A gear shifting system according to any of the preceding or subsequent illustrations or combination of illustrations, wherein the pinion gear assembly (13) comprises any number of sections (25, 40) from two to as many as the number of engaging elements (22) in the spinner (29).

Illustration 22. A gear shifting system according to any of the preceding or subsequent illustrations or combination of illustrations, wherein the pinion gear assembly (13) comprises two to twelve sections (25, 40).

Illustration 23. A gear shifting system according to any of the preceding or subsequent illustrations or combination of illustrations, wherein the pinion gear assembly (13) comprises two sections (25, 40) wherein all the sections (25, 40) has an unequal number of engaging elements (22).

Illustration 24. A gear shifting system according to any of the preceding or subsequent illustrations or combination of illustrations, wherein the pinion gear assembly (13) comprises at least two sections (25) and a rotator (40), which may either move independently of each other; or wherein at least one section (25) and a rotator (40) move in a master/slave configuration.

Illustration 25. A gear shifting system according to any of the preceding or subsequent illustrations or combination of illustrations, wherein the rotator (40) can move both axially on the drive shaft (8) axis; and rotate around the drive shaft (8) from 0° up to 36° of rotation.

Illustration 26. A gear shifting system according to any of the preceding or subsequent illustrations or combination of illustrations, wherein the pinion gear assembly (13) comprises at least two sections (25a, 25b) and a rotator (40), wherein the section (25b) behaves as a master; and the section (25a) and rotator (40) behaves as a slave.

Illustration 27. A gear shifting system according to any of the preceding or subsequent illustrations or combination of illustrations, wherein the power transmission component is a front face gear (6), which is connected to pedals on a bicycle and/or a motor.

Illustration 28. A gear shifting system according to any of the preceding or subsequent illustrations or combination of illustrations, wherein the engaging elements (22) are fixed engaging elements and/or rolling elements.

Illustration 29. A gear shifting system according to any of the preceding or subsequent illustrations or combination of illustrations, wherein the engaging elements (22) are fixed teeth, 3D-non rolling objects, bushings, bearings, ball bearings, roller bearings and/or double row ball bearings.

Illustration 30. A method of shifting gears, the method comprising a gear shifting system according to any of the preceding or subsequent illustrations or combination of illustrations, wherein before gear shifting is initiated, all of the sections (25, 40) are engaging the same gear-ring (32c) on the face gear (7); when gear shifting is initiated, at least one section (25a, 40) is still engaging the initial gear-ring (32c), whereas at least one other section (25b) moves axially, and in which this other section (25b) moves as to enter into the path of alignment with the new gear-ring (32d); as the shaft (8) and pinion gear assembly (13) continues to rotate, the other section (25a, 40), which is now aligned to the new gear-ring (32d), will engage in the new gear-ring (32d) on the face gear (7) as the shaft (8) and pinion gear assembly (13) continue to rotate; as the initial section(s) (25a, 40) disengage with the initial gear-ring (32c), the initial section (25a, 40) will move axially, in the similar direction of the other sections (25b) which have already moved axially; within one shaft rotation, all of the initial section(s) (25a) will have disengaged the initial gear-ring (32c) of the face gear (7), and subsequently moved axially to follow the other section(s) (25b) to become aligned, and engaged with, the new gear-ring (32d); and at this point all of the engaging elements (22) composing the sections (25) have moved, and have aligned with, the new gear-ring (32d), and are again located within the same rotational plane; and at this point, the gear shifting is finalized and complete, and normal operation returns to the gear system.

Illustration 31. A method of shifting gears with the gear shifting system according to any of the preceding or subsequent illustrations or combination of illustrations, wherein the at least one concentric gear-ring comprises a first gear-ring and a second gear-ring, wherein the at least two sections of the spinner comprise a first section and a second section, and wherein before gear shifting is initiated, the first section and the second section of the spinner are both engaged with the first gear-ring, wherein the method of shifting gears comprises: disengaging the first section of the spinner from the first gear-ring and axially moving the first section into alignment with the second gear-ring while maintaining engagement between the second section of the spinner and the first gear-ring; causing the shaft to rotate and as the shaft rotates, engaging the first section of the spinner with the second gear-ring; disengaging the second section of the spinner from the first gear-ring and axially moving the second section into alignment and engagement with the second gear-ring while maintaining engagement between the first section of the spinner and the second gear-ring such that the engaging elements composing the first section and the second section are engaged with the second gear-ring and are located within the same rotational plane.

Illustration 32. A gear shifting system comprising: a drive shaft comprising an axis of rotation, a first end, and a second end; a power transmission component coupled to the second end of the drive shaft; and a face gear comprising a cog-disk and a concentric gear-ring, wherein the drive shaft further comprises a pinion gear assembly coupled to the first end of the drive shaft, wherein the pinion gear assembly is configured to mesh with the concentric gear-ring so that the rotational movement of the gear-ring is transmitted to the shaft, and wherein the pinion gear assembly comprises: at least one engaging element engaging the concentric gear-ring of face gear; and a spinner comprising at least two sections and a rotator, wherein each of the at least sections are independently movable relative to each other.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A gear shifting system comprising:
   a drive shaft comprising an axis of rotation, a first end, and a second end;
   at least one power transmission component coupled to the second end of the drive shaft; and
   a face gear comprising a cog-disk and at least one concentric gear-ring,
   wherein the drive shaft further comprises a pinion gear assembly coupled to the first end of the drive shaft,
   wherein the pinion gear assembly is configured to mesh with the at least one concentric gear-ring so that rotational movement of the gear-ring is transmitted to the drive shaft,
   wherein the pinion gear assembly comprises:
      at least one engaging element engaging the at least one concentric gear-ring of the face gear; and
      a spinner, wherein the spinner comprises at least two sections and a rotator, and
   wherein the at least two sections and the rotator each move independently of each other, or wherein one section of the at least two sections and the rotator move in a master/slave configuration.

2. The gear shifting system according to claim 1, wherein a number of sections of the spinner is not more than a number of engaging elements of the pinion gear assembly.

3. The gear shifting system according to claim 1, wherein the at least two sections comprises two sections to twelve sections.

4. The gear shifting system according to claim 1, wherein the pinion gear assembly comprises at least two sections, and wherein all the sections have an unequal number of engaging elements.

5. The gear shifting system according to claim 1, wherein the rotator is movable axially on the axis of the drive shaft and is rotatable around the drive shaft from 0° up to 36° of rotation.

6. The gear shifting system according to claim 5, wherein one section of the at least two sections of the spinner behaves as a master, and wherein the other section of the at least two sections and the rotator behave as a slave.

7. The gear shifting system according to claim 1, wherein the at least one power transmission component is a front face gear, which is connected to pedals on a bicycle and/or a motor.

8. The gear shifting system according to claim 1, wherein the engaging elements are fixed engaging elements and/or rolling elements.

9. The gear shifting system according to claim 8, wherein the engaging elements comprise fixed teeth, 3D-non rolling objects, bushings, bearings, ball bearings, roller bearings and/or double row ball bearings.

10. The gear shifting system according to claim 1, wherein the at least one concentric gear-ring comprises a plurality of concentric gear-rings.

11. A method of shifting gears using the gear shifting system according to claim 1, wherein the at least one concentric gear-ring comprises a plurality of concentric gear-rings, and wherein the method comprises:
before gear shifting is initiated, all of the at least two sections of the spinner are engaging a first gear-ring of the plurality of concentric gear-rings on the face gear;
when gear shifting is initiated, a first section of the at least two sections of the spinner is engaging the first gear-ring of the plurality of concentric gear-rings and a second section of the at least two sections of the spinner moves axially and enters into a path of alignment with a second gear-ring of the plurality of concentric gear-rings;
as the drive shaft and pinion gear assembly rotate, the second section of the at least two sections of the spinner is aligned to the second gear-ring of the plurality of concentric gear-rings and engages the second gear-ring as the drive shaft and pinion gear assembly continue to rotate; and
as the first section of the spinner disengages with the first gear-ring of the plurality of concentric gear-rings, the first section moves axially in a similar direction as the second section,
wherein, within one shaft rotation, the first section has disengaged the first gear-ring and subsequently moved axially into alignment and engagement with the second gear-ring and such that all of the engaging elements composing the at least two sections have moved and have aligned with the second gear-ring and are located within a same rotational plane, and at this point, the gear shifting is finalized and complete, and normal operation returns to the gear system.

12. A method of shifting gears using the gear shifting system according to claim 1, wherein the at least one concentric gear-ring comprises a first gear-ring and a second gear-ring, wherein the at least two sections of the spinner comprise a first section and a second section, and wherein before gear shifting is initiated, the first section and the second section of the spinner are both engaged with the first gear-ring, wherein the method of shifting gears comprises:
disengaging the first section of the spinner from the first gear-ring and axially moving the first section into alignment with the second gear-ring while maintaining engagement between the second section of the spinner and the first gear-ring;
causing the shaft to rotate and as the shaft rotates, engaging the first section of the spinner with the second gear-ring; and
disengaging the second section of the spinner from the first gear-ring and axially moving the second section into alignment and engagement with the second gear-ring while maintaining engagement between the first section of the spinner and the second gear-ring such that the engaging elements composing the first section and the second section are engaged with the second gear-ring and are located within the same rotational plane.

13. A gear shifting system comprising:
a drive shaft comprising an axis of rotation, a first end, and a second end;
at least one power transmission component coupled to the second end of the drive shaft; and
a face gear comprising a cog-disk and at least one concentric gear-ring,
wherein the drive shaft further comprises a pinion gear assembly coupled to the first end of the drive shaft,
wherein the pinion gear assembly is configured to mesh with the at least one concentric gear-ring so that rotational movement of the gear-ring is transmitted to the drive shaft,
wherein the pinion gear assembly comprises:
at least one engaging element engaging the at least one concentric gear-ring of the face gear; and
a spinner, wherein the spinner comprises at least two sections and a rotator, and
wherein the pinion gear assembly comprises at least two sections, and wherein all the sections have an unequal number of engaging elements.

14. A gear shifting system comprising:
a drive shaft comprising an axis of rotation, a first end, and a second end;
at least one power transmission component coupled to the second end of the drive shaft; and
a face gear comprising a cog-disk and at least one concentric gear-ring,
wherein the drive shaft further comprises a pinion gear assembly coupled to the first end of the drive shaft,
wherein the pinion gear assembly is configured to mesh with the at least one concentric gear-ring so that rotational movement of the gear-ring is transmitted to the drive shaft,
wherein the pinion gear assembly comprises:
at least one engaging element engaging the at least one concentric gear-ring of the face gear; and
a spinner, wherein the spinner comprises at least two sections and a rotator, and
wherein the rotator is movable axially on the axis of the drive shaft and is rotatable around the drive shaft from 0° up to 36° of rotation.

* * * * *